(12) United States Patent
Bouras

(10) Patent No.: US 7,969,222 B2
(45) Date of Patent: Jun. 28, 2011

(54) METHOD AND SYSTEM FOR DC OFFSET CORRECTION LOOP FOR A MOBILE DIGITAL CELLULAR TELEVISION ENVIRONMENT

(75) Inventor: Stamatios Alexandros Bouras, Ilioupolis (GR)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/385,101

(22) Filed: Mar. 21, 2006

(65) Prior Publication Data

US 2007/0063757 A1    Mar. 22, 2007

Related U.S. Application Data

(60) Provisional application No. 60/717,915, filed on Sep. 16, 2005, provisional application No. 60/778,232, filed on Mar. 2, 2006.

(51) Int. Cl.
*H03L 5/00* (2006.01)
(52) U.S. Cl. .......................... 327/307; 327/337; 327/95
(58) Field of Classification Search .................. 327/307, 327/337, 95
See application file for complete search history.

(56) References Cited

U.S. PATENT DOCUMENTS

| | | | |
|---|---|---|---|
| 5,463,603 A | 10/1995 | Petersen | |
| 5,471,665 A * | 11/1995 | Pace et al. ................... | 455/343.2 |
| 6,509,777 B2 * | 1/2003 | Razavi et al. .................. | 327/307 |
| 6,670,901 B2 | 12/2003 | Brueske et al. | |
| 6,940,365 B2 | 9/2005 | Kamata et al. | |
| 6,992,526 B2 * | 1/2006 | Cheng ............................. | 330/9 |
| 7,092,043 B2 | 8/2006 | Vorenkamp et al. | |
| 7,113,016 B2 * | 9/2006 | Hsieh et al. .................... | 327/307 |
| 7,171,176 B1 | 1/2007 | Birleson | |
| 7,196,579 B2 * | 3/2007 | Ozawa ........................... | 330/133 |
| 7,369,660 B1 | 5/2008 | Kahn et al. | |
| 7,376,409 B2 | 5/2008 | Pan | |
| 2003/0069036 A1 | 4/2003 | Forrester | |
| 2003/0119466 A1 | 6/2003 | Goldman | |
| 2004/0150456 A1 * | 8/2004 | Radice et al. .................. | 327/334 |
| 2005/0110550 A1 * | 5/2005 | Shi et al. ........................ | 327/307 |
| 2005/0147192 A1 | 7/2005 | Yamamoto et al. | |
| 2005/0276358 A1 | 12/2005 | Pipilos | |
| 2006/0035619 A1 | 2/2006 | Hallivuori et al. | |
| 2006/0068740 A1 | 3/2006 | Yokoyama | |

(Continued)

OTHER PUBLICATIONS

Antoine, et al., A Direct-Conversion Receiver for DVB-H, IEEE Journal of Solid-State Circuits, vol. 40, No. 12, Dec. 2005, pp. 2536-2546.

(Continued)

*Primary Examiner* — Long Nguyen
(74) *Attorney, Agent, or Firm* — McAndrews, Held & Malloy, Ltd.

(57) ABSTRACT

Methods and systems for a DC offset correction loop for a mobile digital cellular television environment are disclosed. Aspects of one method may include removing at least a portion of a DC offset from output of an amplifier. The DC offset may be removed from a single stage amplifier, or from each stage of a N stage amplifier, where N may be an integer. The DC offset may be removed by using second differential signals generated from first differential signals, where the second differential signals may be communicated to inputs of the amplifier. The first differential signals may by a first circuit that integrates outputs of the amplifier. The first circuit may perform the integration using a variable corner frequency that may be adjusted by changing a resistance of at least one variable resistor in the first circuit.

34 Claims, 11 Drawing Sheets

U.S. PATENT DOCUMENTS

| | | | |
|---|---|---|---|
| 2006/0132235 A1* | 6/2006 | Ozawa | 330/254 |
| 2006/0135195 A1 | 6/2006 | Leinonen et al. | |
| 2006/0276149 A1 | 12/2006 | Womac et al. | |
| 2007/0002961 A1 | 1/2007 | Hoctor et al. | |
| 2007/0049224 A1 | 3/2007 | Womac | |

OTHER PUBLICATIONS

Dawkins, et al., A Single-Chip Tuner for DVB-T, IEEE Journal of Solid-State Circuits, vol. 38, No. 8, Aug. 2003, pp. 1307-1317.

Mobile and Portable DVB-T Radio Access Interface Specification, EICTA, European Industry Association, EICTA/TAC/MBRAI-02-16, pp. 1-46.

Koli, "A 2.5 V Temperature Compensated CMOS Logarithmic Amplifier" in Proc. IEEE Custom Integrated Circuits Conf., Santa Clara, CA, May 1997, pp. 79-82.

Magoon, "A Single-Chip Quad-Band (850/90011800/1900 MHz) Direct Conversion GSM/GPRS RF Transceiver With Integrated VCOs and Fractional-N Synthesizer", IEEE Journal of Solid-State Circuits, vol. 37, Issue 12, Dec. 2002 pp. 1710-1720.

Molnar, "A Single-Chip Quad-Band (850/900/1800/1900 MHZ) Direct-Conversion GSM/GPRS RF Transceiver with Integrated VCOs and Fractional-N Synthesizer", 2002 IEEE International Solid-State Circuits Conference, 2002. Digest of Technical Papers, ISSCC, vol. 1, Feb. 3-7, 2002 pp. 232-462 vol. 1.

Molnar, "A Single-Chip Quad-Band (850/900/1800/1900 Mhz) Direct-Conversion GSM/GPRS RF Transceiver with Integrated VCOs and Fractional-N Synthesizer", 2002 IEEE International Solid-State Circuits Conference, 2002. Digest of Technical Papers, ISSCC, vol. 2, Feb. 3-7, 2002 pp. 184-463.

Kim, "System Level Design of Multi-Standard Receiver Using Reconfigurable RF Block," J. Semicond. Technol.Sci., vol. 4, No. 3, Sep. 2004.

Rogers A Multiband $\Delta\Sigma$ Fractional-N Frequency Synthesizer for a MIMO WLAN Transceiver RFIC, Solid-State Circuits, IEEE Journal of vol. 40, Issue 3, Mar. 2005 pp. 678-689.

Temporiti, "A 700-kHz Bandwidth $\Delta\Sigma$ Fractional Synthesizer with Spurs Compensation and Linearization Techniques for WCDMA Applications," in IEEE Int. Solid-State Circuits Conf. Dig. Tech. Papers, San Francisco, CA, Feb. 2004, pp. 1446-1454.

Womac, "Global Mobile TV Standard Makes it Possible to Tune in Digital TV Signals on the Move", Jun. 2005.

Antoine, "A Direct-Conversion Receiver for DVB-H", ISSCC 2005 IEEE International Solid-State Circuits Conference, 2005, Digest of Technical Papers, Feb. 10-10, 2005 pp. 426-607 vol. 1.

Love, "Single-Chip Tuner Enables Broadcast TV in Both European and North American Handsets", eeProductCenter (Jun. 6, 2005 6:32 AM ET).

Vassiliou, "A 0.18/spl mu/m CMOS Dual-Band Direct-Conversion DVB-H Receiver", ISSCC 2006, Digest of Technical Papers, IEEE International Solid-State Circuits Conference, 2006, Feb. 6-9, 2006 pp. 2494-2503.

Patrick Antonine, et al., A Direct-Conversion Receiver For DVB-H, IEEE Journal of Solid-State Circuits, vol. 40, No. 12, Dec. 2005, pp. 2536-2546.

Mark Dawkins, Alison Payne Burdett, Nick Cowley, A Single-Chip Tuner For DVB-T, IEEE Journal of Solid-State Circuits, vol. 38, No. 8, Aug. 2003, pp. 1307-1317.

EICTA—European Industry Association, Information Systems Communication Technologies Consumer Electronics, EICTA/TAC/MBRAI-0216, Mobile and Portable DVB-T Radio Access Interface Specification, Version 1.0, Jan. 1, 2004, pp. 1-46.

* cited by examiner

METHOD AND SYSTEM FOR DC OFFSET CORRECTION LOOP FOR A MOBILE DIGITAL CELLULAR TELEVISION ENVIRONMENT

CROSS-REFERENCE TO RELATED APPLICATIONS/INCORPORATION BY REFERENCE

This application make reference to, claims priority to, and claims the benefit of:
U.S. Provisional Application Ser. No. 60/717,915 filed on Sep. 16, 2005; and
U.S. Provisional Application Ser. No. 60/778,232 filed on Mar. 2, 2006.

This application also makes reference to:
U.S. application Ser. No. 11/385,390 filed on even date herewith;
U.S. application Ser. No. 11/385,423 filed on even date herewith;
U.S. application Ser. No. 11/385,389 filed on even date herewith;
U.S. application Ser. No. 11/385,401 filed on even date herewith; and
U.S. application Ser. No. 11/385,081 filed on even date herewith.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to receiver circuitry. More specifically, certain embodiments of the invention relate to a method and system for a DC offset correction loop for a mobile digital cellular television environment.

BACKGROUND OF THE INVENTION

Broadcasting and telecommunications have historically occupied separate fields. In the past, broadcasting was largely an "over-the-air" medium while wired media carried telecommunications. That distinction may no longer apply as both broadcasting and telecommunications may be delivered over either wired or wireless media. Present development may adapt broadcasting to mobility services. One limitation has been that broadcasting may often require high bit rate data transmission at rates higher than could be supported by existing mobile communications networks. However, with emerging developments in wireless communications technology, even this obstacle may be overcome.

Terrestrial television and radio broadcast networks have made use of high power transmitters covering broad service areas, which enable one-way distribution of content to user equipment such as televisions and radios. By contrast, wireless telecommunications networks have made use of low power transmitters, which have covered relatively small areas known as "cells". Unlike broadcast networks, wireless networks may be adapted to provide two-way interactive services between users of user equipment such as telephones and computer equipment.

The introduction of cellular communications systems in the late 1970's and early 1980's represented a significant advance in mobile communications. The networks of this period may be commonly known as first generation, or "1G" systems. These systems were based upon analog, circuit-switching technology, the most prominent of these systems may have been the advanced mobile phone system (AMPS). Second generation, or "2G" systems ushered improvements in performance over 1G systems and introduced digital technology to mobile communications. Exemplary 2G systems include the global system for mobile communications (GSM), digital AMPS (D-AMPS), and code division multiple access (CDMA). Many of these systems have been designed according to the paradigm of the traditional telephony architecture, often focused on circuit-switched services, voice traffic, and supported data transfer rates up to 14.4 kbits/s. Higher data rates were achieved through the deployment of "2.5G" networks, many of which were adapted to existing 2G network infrastructures. The 2.5G networks began the introduction of packet-switching technology in wireless networks. However, it is the evolution of third generation, or "3G" technology that may introduce fully packet-switched networks, which support high-speed data communications.

Standards for digital television terrestrial broadcasting (DTTB) have evolved around the world with different systems being adopted in different regions. The three leading DTTB systems are, the advanced standards technical committee (ATSC) system, the digital video broadcast terrestrial (DVB-T) system, and the integrated service digital broadcasting terrestrial (ISDB-T) system. The ATSC system has largely been adopted in North America, South America, Taiwan, and South Korea. This system adapts trellis coding and 8-level vestigial sideband (8-VSB) modulation. The DVB-T system has largely been adopted in Europe, the Middle East, Australia, as well as parts of Africa and parts of Asia. The DVB-T system adapts coded orthogonal frequency division multiplexing (COFDM). The OFDM spread spectrum technique may be utilized to distribute information over many carriers that are spaced apart at specified frequencies. The OFDM technique may also be referred to as multi-carrier or discrete multi-tone modulation. The spacing between carriers may prevent the demodulators in a radio receiver from seeing frequencies other than their corresponding frequency. This technique may result in spectral efficiency and lower multi-path distortion, for example. The ISDB-T system has been adopted in Japan and adapts bandwidth segmented transmission orthogonal frequency division multiplexing (BST-OFDM). The various DTTB systems may differ in important aspects; some systems employ a 6 MHz channel separation, while others may employ 7 MHz or 8 MHz channel separations.

While 3G systems are evolving to provide integrated voice, multimedia, and data services to mobile user equipment, there may be compelling reasons for adapting DTTB systems for this purpose. One of the more notable reasons may be the high data rates that may be supported in DTTB systems. For example, DVB-T may support data rates of 15 Mbits/s in an 8 MHz channel in a wide area SFN. There are also significant challenges in deploying broadcast services to mobile user equipment. Because of form factor constraints, many handheld portable devices, for example, may require that PCB area be minimized and that services consume minimum power to extend battery life to a level that may be acceptable to users. Another consideration is the Doppler effect in moving user equipment, which may cause inter-symbol interference in received signals. Among the three major DTTB systems, ISDB-T was originally designed to support broadcast services to mobile user equipment. While DVB-T may not have been originally designed to support mobility broadcast services, a number of adaptations have been made to provide support for mobile broadcast capability. The adaptation of DVB-T to mobile broadcasting is commonly known as DVB handheld (DVB-H). The broadcasting frequencies for Europe are in UHF (bands IV/V) and in the US, the 1670-1675 MHz band that has been allocated for DVB-H operation. Additional spectrum is expected to be allocated in the L-band world-wide.

To meet requirements for mobile broadcasting the DVB-H specification may support time slicing to reduce power consumption at the user equipment, addition of a 4K mode to enable network operators to make tradeoffs between the advantages of the 2K mode and those of the 8K mode, and an additional level of forward error correction on multi-protocol encapsulated data-forward error correction (MPE-FEC) to make DVB-H transmissions more robust to the challenges presented by mobile reception of signals and to potential limitations in antenna designs for handheld user equipment. DVB-H may also use the DVB-T modulation schemes, like QPSK and 16-quadrature amplitude modulation (16-QAM), which may be more resilient to transmission errors. MPEG audio and video services may be more resilient to error than data, thus additional forward error correction may not be required to meet DTTB service objectives.

While several adaptations have been made to provide support for mobile broadcast capabilities in DVB-T, concerns regarding device size, cost, and/or power requirements still remain significant constraints for the implementation of handheld portable devices enabled for digital video broadcasting operations. For example, a demodulator may be used to accurately recover data from the received signals that may have been down-converted to baseband signals. However, the baseband signals may have unwanted direct current (DC) offsets that may adversely affect the data extracted from the baseband signals.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for a DC offset correction loop for a mobile digital cellular television environment, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a DC offset correction loop for a mobile digital cellular television environment. Aspects of the method may comprise removing at least a portion of a DC offset from outputs of an amplifier. The DC offset may be removed from a single stage amplifier, or from each stage of a N stage amplifier, where N may be an integer.

In accordance with various embodiments of the invention, the DC offset may be removed by using second differential signals generated from first differential signals, where the second differential signals may be communicated to inputs of the amplifier. The first differential signals may be generated by a first circuit that integrates outputs of the amplifier using a variable corner frequency that may be adjusted by changing a resistance of at least one variable resistor in the first circuit. The second differential signals may be generated from the first differential signals based on a second corner frequency that may be lower than the first corner frequency.

In another aspect of the invention, a substantially constant second differential signals may be generated from a substantially constant first differential signals, which may be a voltage generated across capacitors when the capacitors are isolated from the first circuit. The capacitors may be charged by the outputs of the first circuit, and then isolated by opening, for example, a double-pole switch, or two single-pole switches, between the capacitors and the first circuit. Accordingly, the voltages across the capacitors may remain substantially constant for a period of time, and may decrease due to leakage of current in the second circuit. The second differential signals may generally be communicated to the amplifier. However, at times, the second differential signals may not be communicated to the amplifier. This may be accomplished by, for example, opening a double-pole switch, or two single-pole switches, that couples the second circuit to an input of the amplifier.

Figure 1A:
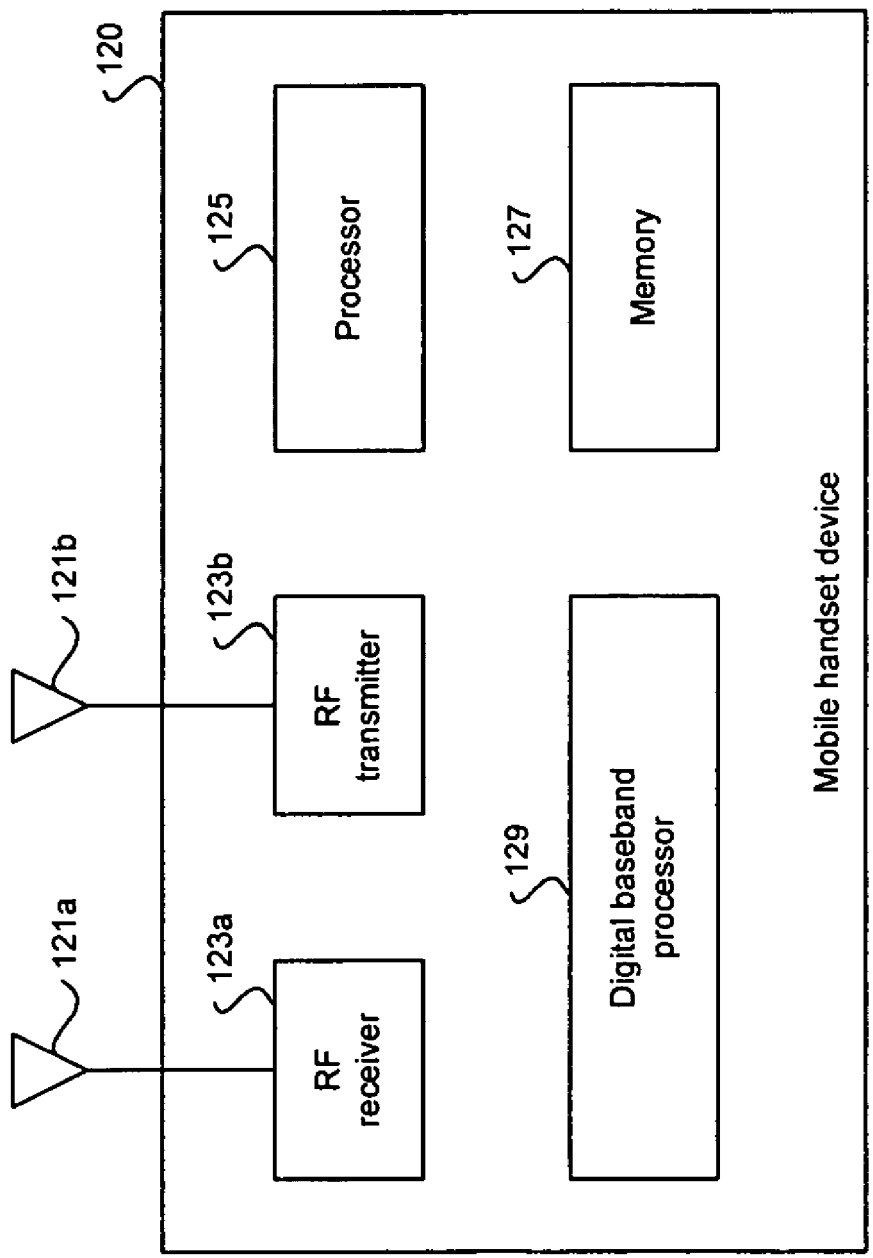
FIG. 1a is a block diagram illustrating an exemplary mobile terminal, in accordance with an embodiment of the invention.

FIG. 1*a* is a block diagram illustrating an exemplary mobile terminal, in accordance with an embodiment of the invention. Referring to FIG. 1*a*, there is shown a mobile terminal 120 that may comprise an RF receiver 123*a*, an RF transmitter 123*b*, a digital baseband processor 129, a processor 125, and a memory 127. A receive antenna 121*a* may be communicatively coupled to the RF receiver 123*a*. A transmit antenna 121*b* may be communicatively coupled to the RF transmitter 123*b*. The mobile terminal 120 may be operated in a system, such as, for example, a cellular network and/or digital video broadcast network. U.S. application Ser. No. 11/385,390 is filed on the even date herewith and discloses an exemplary system in which the terminal 120 may operate.

The RF receiver 123*a* may comprise suitable logic, circuitry, and/or code that may enable processing of received RF signals. The RF receiver 123*a* may enable receiving RF signals in a plurality of frequency bands. For example, the RF receiver 123*a* may enable receiving DVB-H transmission signals via the UHF band, from about 470 MHz to about 890 MHz, the 1670-1675 MHz band, and/or the L-band, from about 1400 MHz to about 1700 MHz, for example. Moreover, the RF receiver 123*a* may enable receiving signals in cellular frequency bands, for example. Each frequency band supported by the RF receiver 123*a* may have a corresponding front-end circuit for handling low noise amplification and down conversion operations, for example. In this regard, the RF receiver 123*a* may be referred to as a multi-band receiver when it supports more than one frequency band. In another embodiment of the invention, the mobile terminal 120 may comprise more than one RF receiver 123*a*, wherein each of the RF receiver 123*a* may be a single-band or a multi-band receiver.

The RF receiver 123*a* may quadrature down convert the received RF signal to a baseband frequency signal that comprises an in-phase (I) component and a quadrature (Q) component. The RF receiver 123*a* may perform direct down conversion of the received RF signal to a baseband frequency signal, for example. In some instances, the RF receiver 123*a* may enable analog-to-digital conversion of the baseband signal components before transferring the components to the digital baseband processor 129. In other instances, the RF receiver 123*a* may transfer the baseband signal components in analog form.

The digital baseband processor 129 may comprise suitable logic, circuitry, and/or code that may enable processing and/or handling of baseband frequency signals. In this regard, the digital baseband processor 129 may process or handle signals received from the RF receiver 123*a* and/or signals to be transferred to the RF transmitter 123*b*, when the RF transmitter 123*b* is present, for transmission to the network. The digital baseband processor 129 may also provide control and/or feedback information to the RF receiver 123*a* and to the RF transmitter 123*b* based on information from the processed signals. The digital baseband processor 129 may communicate information and/or data from the processed signals to the processor 125 and/or to the memory 127. Moreover, the digital baseband processor 129 may receive information from the processor 125 and/or to the memory 127, which may be processed and transferred to the RF transmitter 123*b* for transmission to the network.

The RF transmitter 123*b* may comprise suitable logic, circuitry, and/or code that may enable processing of RF signals for transmission. The RF transmitter 123*b* may enable transmission of RF signals in a plurality of frequency bands. Moreover, the RF transmitter 123*b* may enable transmitting signals in cellular frequency bands, for example. Each frequency band supported by the RF transmitter 123*b* may have a corresponding front-end circuit for handling amplification and up conversion operations, for example. In this regard, the RF transmitter 123*b* may be referred to as a multi-band transmitter when it supports more than one frequency band. In another embodiment of the invention, the mobile terminal 120 may comprise more than one RF transmitter 123*b*, wherein each of the RF transmitter 123*b* may be a single-band or a multi-band transmitter.

The RF transmitter 123*b* may quadrature up convert the baseband frequency signal comprising I/Q components to an RF signal. The RF transmitter 123*b* may perform direct up conversion of the baseband frequency signal to a baseband frequency signal, for example. In some instances, the RF transmitter 123*b* may enable digital-to-analog conversion of the baseband signal components received from the digital baseband processor 129 before up conversion. In other instances, the RF transmitter 123*b* may receive baseband signal components in analog form.

The processor 125 may comprise suitable logic, circuitry, and/or code that may enable control and/or data processing operations for the mobile terminal 120. The processor 125 may be utilized to control at least a portion of the RF receiver 123*a*, the RF transmitter 123*b*, the digital baseband processor 129, and/or the memory 127. In this regard, the processor 125 may generate at least one signal for controlling operations within the mobile terminal 120. The processor 125 may also enable executing of applications that may be utilized by the mobile terminal 120. For example, the processor 125 may execute applications that may enable displaying and/or interacting with content received via DVB-H transmission signals in the mobile terminal 120.

The memory 127 may comprise suitable logic, circuitry, and/or code that may enable storage of data and/or other information utilized by the mobile terminal 120. For example, the memory 127 may be utilized for storing processed data generated by the digital baseband processor 129 and/or the processor 125. The memory 127 may also be utilized to store information, such as configuration information, that may be utilized to control the operation of at least one block in the mobile terminal 120. For example, the memory 127 may comprise information necessary to configure the RF receiver 123*a* to enable receiving DVB-H transmission in the appropriate frequency band.

Figure 1B:
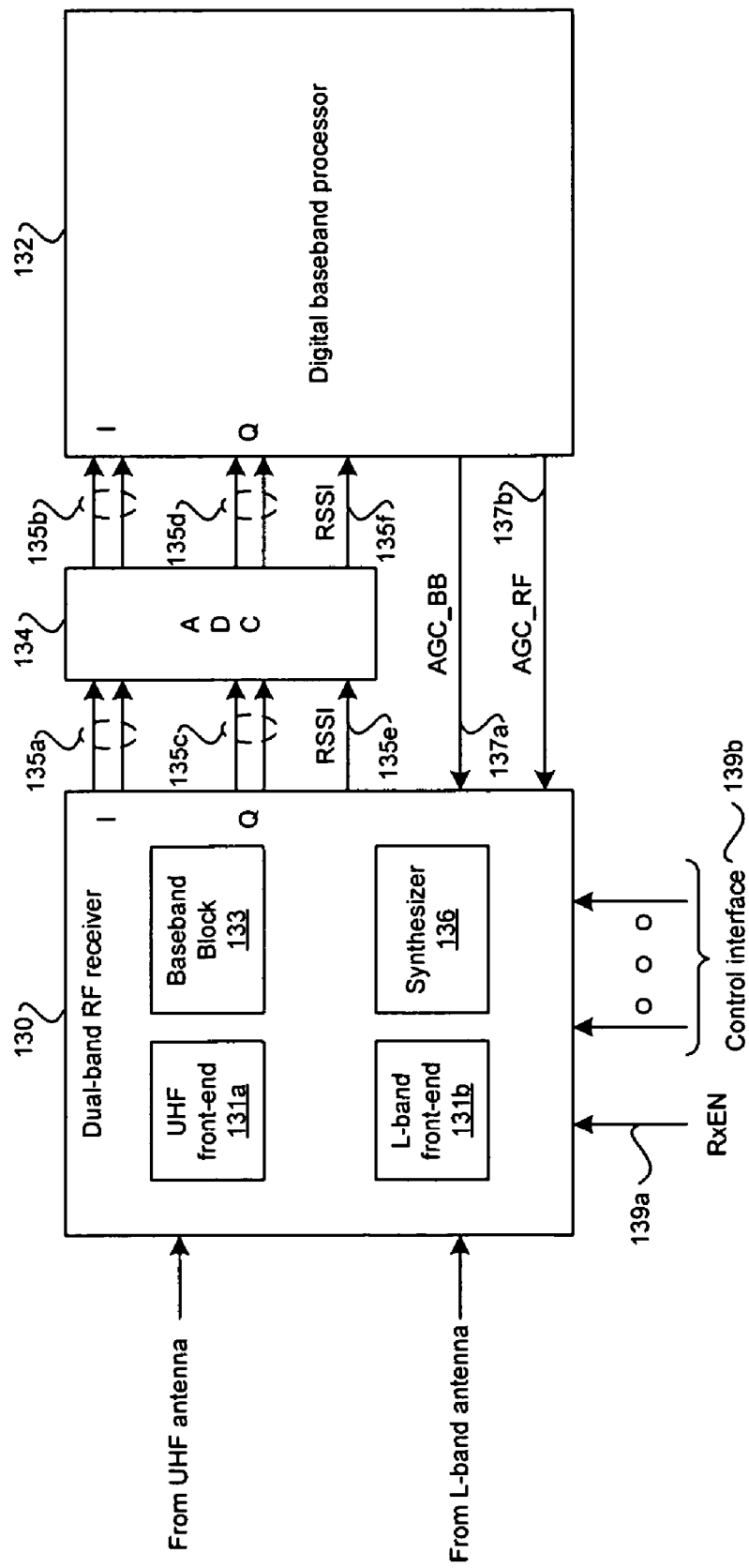
FIG. 1b is a block diagram illustrating exemplary communication between a dual-band RF receiver and a digital baseband processor in a mobile terminal, in accordance with an embodiment of the invention.

FIG. 1*b* is a block diagram illustrating exemplary communication between a dual-band RF receiver and a digital baseband processor in a mobile terminal, in accordance with an embodiment of the invention. Referring to FIG. 1*b*, there is shown a dual-band RF receiver 130, an analog-to-digital converter (ADC) 134, and a digital baseband processor 132. The dual-band RF receiver 130 may comprise a UHF front-end 131*a*, an L-band front-end 131*b*, a baseband block 133*a*, a received signal strength indicator (RSSI) block 133*b*, and a synthesizer 133*c*. The dual-band RF receiver 130, the analog-to-digital converter (ADC) 134, and/or the digital baseband processor 132 may be part of a mobile terminal, such as the mobile terminal 120 in FIG. 1*a*, for example.

The dual-band RF receiver 130 may comprise suitable logic, circuitry, and/or code that may enable handling of UHF and L-band signals. The dual-band RF receiver 130 may be enabled via an enable signal, such as the signal RxEN 139*a*, for example. In this regard, enabling the dual-band RF receiver 130 via the signal RxEN 139*a* by a 1:10 ON/OFF ratio may allow time slicing in DVB-H while reducing power consumption. At least a portion of the circuitry within the dual-band RF receiver 130 may be controlled via the control interface 139*b*. The control interface 139*b* may receive information from, for example, a processor, such as the processor 125 in FIG. 1a, or from the digital baseband processor 132. The control interface 139b may comprise more than one bit. For example, when implemented as a 2-bit interface, the control interface 139a may be an inter-integrated circuit (12C) interface.

The UHF front-end 131a may comprise suitable logic, circuitry, and/or code that may enable low noise amplification and direct down conversion of UHF signals. In this regard, the UHF front-end 131a may utilize an integrated low noise amplifier (LNA) and mixers, such as passive mixers, for example. The UHF front-end 131a may communicate the resulting baseband frequency signals to the baseband block 133a for further processing.

The L-band front-end 131b may comprise suitable logic, circuitry, and/or code that may enable low noise amplification and direct down conversion of L-band signals. In this regard, the L-band front-end 131b may utilize an integrated LNA and mixers, such as passive mixers, for example. The L-band front-end 131b may communicate the resulting baseband frequency signals to the baseband block 133a for further processing. The dual-band RF receiver 130 may enable one of the UHF front-end 131a and the L-band front-end 131b based on current communication conditions.

The synthesizer 133c may comprise suitable logic, circuitry, and/or code that may enable generating the appropriate local oscillator (LO) signal for performing direct down conversion in either the UHF front-end 131a or the L-band front-end 131b. Since the synthesizer 133c may enable fractional division of a source frequency when generating the LO signal, a large range of crystal oscillators may be utilized as a frequency source for the synthesizer 133c. This approach may enable the use of an existing crystal oscillator in a mobile terminal PCB, thus reducing the number of external components necessary to support the operations of the dual-band RF receiver 130, for example. The synthesizer 133 may generate a common LO signal for the UHF front-end 131a and for the L-band front-end 131b. In this regard, the UHF front-end 131a and the L-band front-end 131b may enable dividing the LO signal in order to generate the appropriate signal to perform down conversion from the UHF band and from the L-band respectively. In some instances, the synthesizer 133 may have at least one integrated voltage controlled oscillator (VCO) for generating the LO signal. In other instances, the VCO may be implemented outside the synthesizer 133.

The baseband block 133a may comprise suitable logic, circuitry, and/or code that may enable processing of I/Q components generated from the direct down conversion operations in the UHF front-end 131a and the L-band front-end 131b. The baseband block 133a may enable amplification and/or filtering of the I/Q components in analog form. The baseband block 133a may communicate the processed I component, that is, signal 135a, and the processed Q component, that is, signal 135c, to the ADC 134 for digital conversion.

The RSSI block 133b may comprise suitable logic, circuitry, and/or code that may enable measuring the strength, that is, the RSSI value, of a received RF signal, whether UHF or L-band signal. The RSSI measurement may be performed, for example, after the received RF signal is amplified in either the UHF front-end 131a or the L-band front-end 131b. The RSSI block 133b may communicate the analog RSSI measurement, that is, signal 135e, to the ADC 134 for digital conversion.

The ADC 134 may comprise suitable logic, circuitry, and/ or code that may enable digital conversion of signals 135a, 135c, and/or 135e to signals 135b, 135d, and/or 135f respectively. In some instances, the ADC 134 may be integrated into the dual-band RF receiver 130 or into the digital baseband processor 132.

The digital baseband processor 132 may comprise suitable logic, circuitry, and/or code that may enable processing and/or handling of baseband frequency signals. In this regard, the digital baseband processor 132 may be the same or substantially similar to the digital baseband processor 129 described in FIG. 1a. The digital baseband processor 132 may enable generating at least one signal, such as the signals AGC_BB 137a and AGC_RF 137b, for adjusting the operations of the dual-band RF receiver 130. For example, the signal AGC_BB 137a may be utilized to adjust the gain provided by the baseband block 133a on the baseband frequency signals generated from either the UHF front-end 131a or the L-band front-end 131b. In another example, the signal AGC_RF 137b may be utilized to adjust the gain provided by an integrated LNA in either the UHF front-end 131a or the L-band front-end 131b. In another example, the digital baseband processor 132 may generate at least one control signal or control information communicated to the dual-band RF receiver 130 via the control interface 139b for adjusting operations within the dual-band RF receiver 130.

Figure 1C:
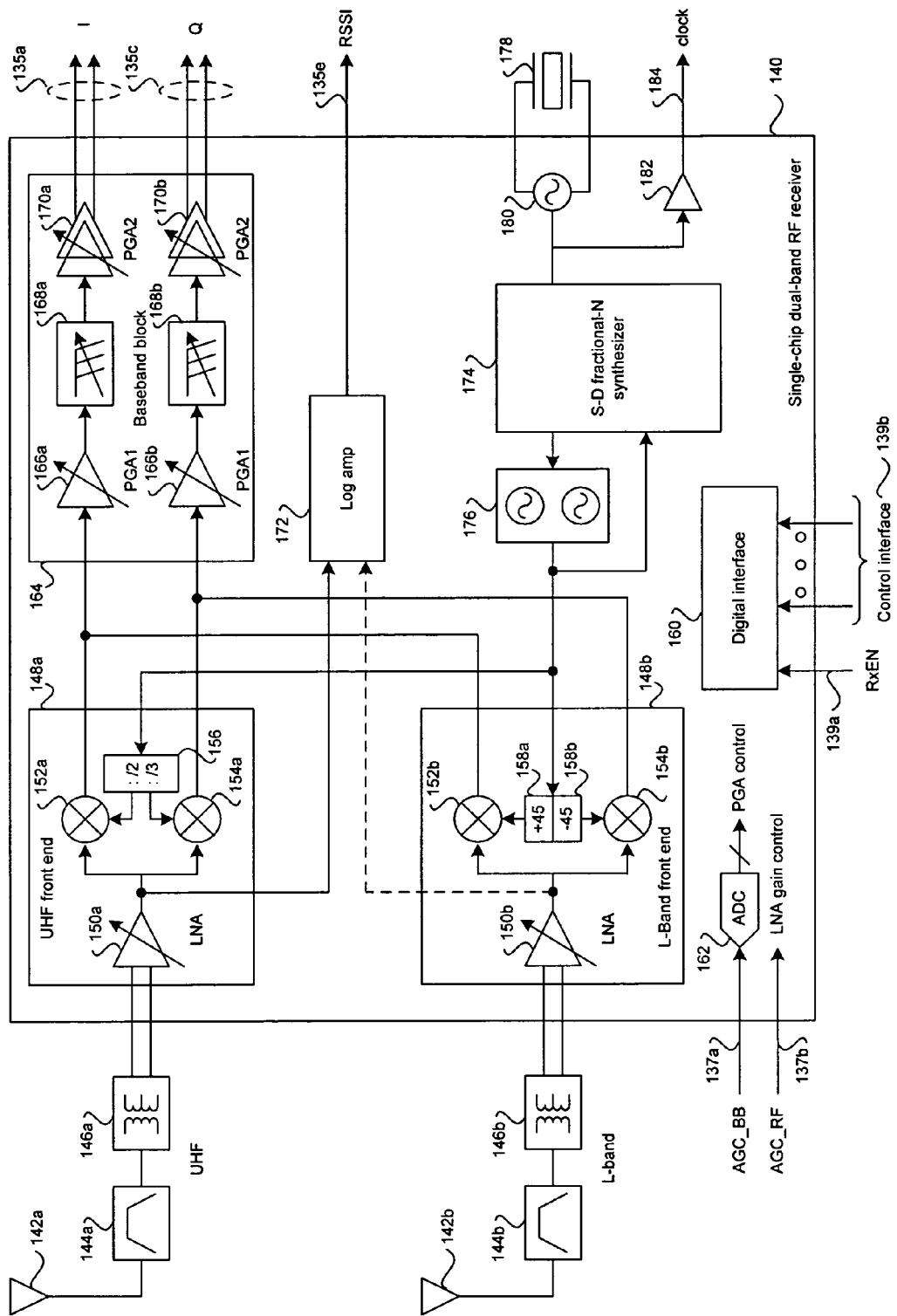
FIG. 1c is a block diagram illustrating an exemplary single-chip dual-band RF receiver with an integrated LNA in each front-end, in accordance with an embodiment of the invention.

FIG. 1c is a block diagram illustrating an exemplary single-chip dual-band RF receiver with an integrated LNA in each front-end, in accordance with an embodiment of the invention. Referring to FIG. 1c, there is shown a single-chip dual-band RF receiver 140a that may comprise a UHF front-end 148a, an L-band front-end 148b, a baseband block 164, a logarithmic amplifier (logarithmic amplifier) 172, a Σ-Δ fractional-N synthesizer 174, a VCO block 176, a digital interface 160, an ADC 162, an oscillator 180, and a buffer 182.

The single-chip dual-band RF receiver 140a may be fabricated using any of a plurality of semiconductor manufacturing processes, for example, complimentary metal-oxide-semiconductor (CMOS) processes, bipolar CMOS (BiCMOS), or Silicon Germanium (SiGe). The single-chip dual-band RF receiver 140a may be implemented using differential structures to minimize noise effects and/or substrate coupling, for example. The single-chip dual-band RF receiver 140a may utilize low drop out (LDO) voltage regulators to regulate and clean up on-chip voltage supplies. In this regard, the LDO voltage regulators may be utilized to transform external voltage sources to the appropriate on-chip voltages.

When the single-chip dual-band RF receiver 140a is implemented utilizing a CMOS process, some design considerations may include achieving low noise figure (NF) values, wide-band operation, high signal-to-noise ration (SNR), performing DC offset removal, achieving high input second-order and third-order intercept points (IIP2 and IIP3), and/or reducing I/Q mismatch, for example.

The single-chip dual-band RF receiver 140a may receive UHF signals via a first antenna 142a, a UHF filter 144a, and a first balum 146a. The UHF filter 144a enables band pass filtering, wherein the band pass may be about 470 to about 702 MHz for cellular signals, for example, or about 470 to about 862 MHz, for other types of received signals, for example. The balum 146a enables balancing the filtered signals before being communicated to the UHF front-end 148a.

The single-chip dual-band RF receiver 140a may receive L-band signals via a second antenna 142b, an L-band filter 144b, and a second balum 146b. The L-band filter 144b enables band pass filtering, wherein the band pass may be about 1670 to about 1675 MHz for signals in US systems, for example, or about 1450 to about 1490 MHz, for signals in European systems, for example. The balum 146b enables balancing the filtered signals before being communicated to the L-band front-end 148a. In some instances, antennas 142a and 142b may be implemented utilizing a single antenna communicatively coupled to the single-chip dual-band RF receiver 140a that may support receiving radio signals operating in the UHF IV/V and/or L-band, for example.

The UHF front-end 148a may comprise a variable low noise amplifier (LNA) 150a, a mixer 152a, a mixer 154a, and a LO signal divider 156. The variable LNA 150a may comprise suitable logic and/or circuitry that may enable amplification of the UHF signals received. Matching between the output of the balum 146a and the input of the variable LNA 150a may be achieved by utilizing off-chip series inductors, for example. The variable LNA 150a may implement continuous gain control by current steering that may be controlled by a replica scheme within the variable LNA 150a. The gain of the variable LNA 150a may be adjusted via the signal AGC_RF 137b, for example.

The mixers 152a and 154a may comprise suitable logic and/or circuitry that may enable generating in-phase (I) and quadrature (Q) components of the baseband frequency signal based on direct down conversion of the amplified received UHF signal with the quadrature signals 186I and 186Q generated by the divider block 156. The mixers 152a and 154a may be passive mixers in order to achieve high linearity and/or low flicker noise, for example. The LO signal divider 156 may comprise suitable logic, circuitry, and/or code that may enable dividing of the LO signal 186 by a factor of 2 (:/2) or a factor of 3 (:/3) and at the same time provide quadrature outputs 186I and 186Q, wherein 186I and 186Q have 90 degrees separation between them. The factor of 3 division may be used when the received UHF signal band is about 470 to about 600 MHz, for example. The factor of 2 division may be used when the received UHF signal band is about 600 to about 900 MHz, for example. The I/Q components generated by the mixers 152a and 154a may be communicated to the baseband block 164.

The L-band front-end 148b may comprise a variable LNA 150b, a mixer 152a, a mixer 154a, and a LO signal generator 158. The variable LNA 150a may comprise suitable logic and/or circuitry that may enable amplification of the L-band signals received. Matching between the output of the balum 146b and the input of the variable LNA 150b may be achieved by utilizing off-chip series inductors, for example. The variable LNA 150b may implement continuous gain control by current steering that may be controlled by a replica scheme within the variable LNA 150b. The gain of the variable LNA 150b may be adjusted via the signal AGC_RF 137b, for example.

The mixers 152b and 154b may comprise suitable logic and/or circuitry that may enable generating I/Q components of the baseband frequency signal based on the direct down conversion of the amplified received L-band signal with the LO signals 158I and 158Q generated by the LO generator block 158. The mixers 152b and 154b may be passive mixers in order to achieve high linearity and/or low flicker noise, for example. The LO signal generator 158 may comprise suitable logic, circuitry, and/or code that may enable generation of quadrature LO signals 158I and 158Q, that is, signals with 90 degree phase split between them, from the LO signal 186. The I/Q components generated by the mixers 152b and 154b may be communicated to the baseband block 164.

The logarithmic amplifier 172 may comprise suitable logic, circuitry, and/or code that may enable generation of a wideband, received signal strength indicator (RSSI) signal, such as the signal 135e, based on the output of the variable LNA 150a. The RSSI signal indicates the total amount of signal power that is present at the output of the LNA, for example. The RSSI signal may be utilized by, for example, the digital baseband processor 132 in FIG. 1b, to adjust the gain of the variable LNA 150a in the presence of RF interference to achieve NF and/or linearity performance that meets blocking and/or intermodulation specifications, for example. In this regard, interference may refer to blocker signals, for example. Blocker signals may be unwanted signals in frequency channels outside the wanted or desired channel that may disturb the reception of the wanted signals. This effect may be a result of blockers generating large signals within the receiver path. These large signals may introduce harmonics, intermodulation products, and/or unwanted mixing products that crosstalk with the wanted signals. In another embodiment of the invention, the logarithmic amplifier 172 may enable generating a wideband, RSSI signal, such as the signal 135e, based on the output of the variable LNA 150b. In this instance, the RSSI signal may be utilized by to adjust the gain of the variable LNA 150b.

The baseband block 164 may comprise an in-phase component processing path and a quadrature component processing path. The in-phase processing path may comprise at least one programmable gain amplifier (PGA) 166a, a baseband filter 168a, and at least one PGA 170a. The quadrature component processing path may comprise at least one PGA 166b, a baseband filter 168b, and at least one PGA 170b. The PGAs 166a, 166b, 170a, and 170b may comprise suitable logic, circuitry, and/or code that may enable amplification of the down converted components of the baseband frequency signal generated by the RF front-end. The gain of the PGAs 166a, 166b, 170a, and 170b may be digitally programmable. In addition, at the output of the PGAs 166a and 166b, a programmable pole may be utilized to reduce linearity requirements for the baseband filters 168a and 168b respectively. Since the static and time-varying DC offset may saturate the operation of the single-chip dual-band RF receiver 140a, the PGAs 166a, 166b, 170a, and 170b may utilize DC servo loops to address DC offset issues. The gain of the PGAs 166a, 166b, 170a, and/or 170b may be controlled via the AGC_BB signal 137a, for example. In this regard, the ADC 162 may be utilized to provide digital control of the PGAs 166a, 166b, 170a, and/or 170b when the AGC_BB signal 137a is an analog signal.

The baseband filters 168a and 168b may comprise suitable logic, circuitry, and/or code that may enable channel selection, for example. Channel selection may be performed by filters, such as an $N^{th}$ order lowpass Chebyschev filter implemented by active integrators in a leapfrog configuration, for example. For the correct tuning of the characteristics of the filters, an on-chip auto-calibration loop may be activated upon power-up. The auto-calibration loop may set up the corner frequency to the correct vale required to meet the requirements of the communications standard for which the receiver is designed. For DVB-T/DVB-H, the value $f_o$ of the filter response may be set to a value from 2 to 5 MHz thus supporting the different channel bandwidths of 5-8 MHz specified by DVB-T/DVB-H standards. During auto-calibration, a tone at the appropriate $f_{-3dB}$ may be generated on-chip and may be applied at the input of the baseband filters 168a and 168b for comparison with the filter output of a root-mean-squared (RMS) detector. A digitally controlled loop may be utilized to adjust the baseband filter bandwidth until the output of the baseband filter and the RMS detector are the same.

The Σ-Δ fractional-N synthesizer 174 may comprise suitable logic, circuitry, and/or code that may enable LO generation that may be independent of the reference crystal frequency, such as the crystal 178, for example. In this regard, the synthesizer 174 may generate a signal, such as the signal 190, for example, to control the operation of the VCO block 176 and therefore the generation of the LO signal 186. Since the synthesizer 174 may enable fractional synthesis, the single-chip dual band RF receiver 140a may utilize the same crystal utilized by other operations in the mobile terminal while maintaining fine tuning capability. The synthesizer 174 may receive a reference frequency signal from the crystal 178 via an oscillator 180, for example. The output of the oscillator 180 may also be buffered by the buffer 182 to generate a clock signal 184, for example.

The VCO block 176 may comprise suitable logic, circuitry, and/or code that may enable generating the LO signal 186 utilized by the UHF front-end 148a and the L-band front-end 148b for direct down conversion of the received RF signals. The VCO block 176 may comprise at least one VCO, wherein each VCO may have cross-coupled NMOS and PMOS devices and metal-oxide-semiconductor (MOS) varactors in an accumulation mode for tuning. In this regard, a switched varactor bank may be utilized for providing coarse tuning. The VCO block 176 may provide a range of about 1.2 to about 1.8 GHz when implemented utilizing two VCOs, for example. When more than one VCO is utilized in implementing the VCO block 176, selecting the proper VCO for generating the LO signal 186 may be based on the type of RF signal being received by the single-chip dual band RF receiver 140a.

The digital interface 160 may comprise suitable logic, circuitry, and/or code that may enable controlling circuitry within the single-chip dual band RF receiver 140a. The digital interface 160 may comprise a plurality of registers for storing control and/or operational information for use by the single-chip dual-band RF receiver 140a. The digital interface 160 may enable receiving the signal RxEN 139a that may be utilized to perform 1:10 ON/OFF ratio time slicing in DVB-H while reducing power consumption. Moreover, the digital interface 160 may enable receiving the control interface 139b from, for example, a processor, such as the processor 125 in FIG. 1a, or from the digital baseband processor 132 in FIG. 1b. The control interface 139b may comprise more than one bit. The control interface 139b may be utilized to control the synthesis operations of the synthesizer 174 and/or the filtering operations of the baseband filters 168a and 168b. The control interface 139b may also be utilized to adjust the bias of circuits within the single-chip dual-band RF receiver 140a, such as those of the variable LNAs 150a and 150b, the PGAs 166a, 166b, 170a, and 170b, and/or the baseband filters 168a and 168b, for example.

Figure 2A:
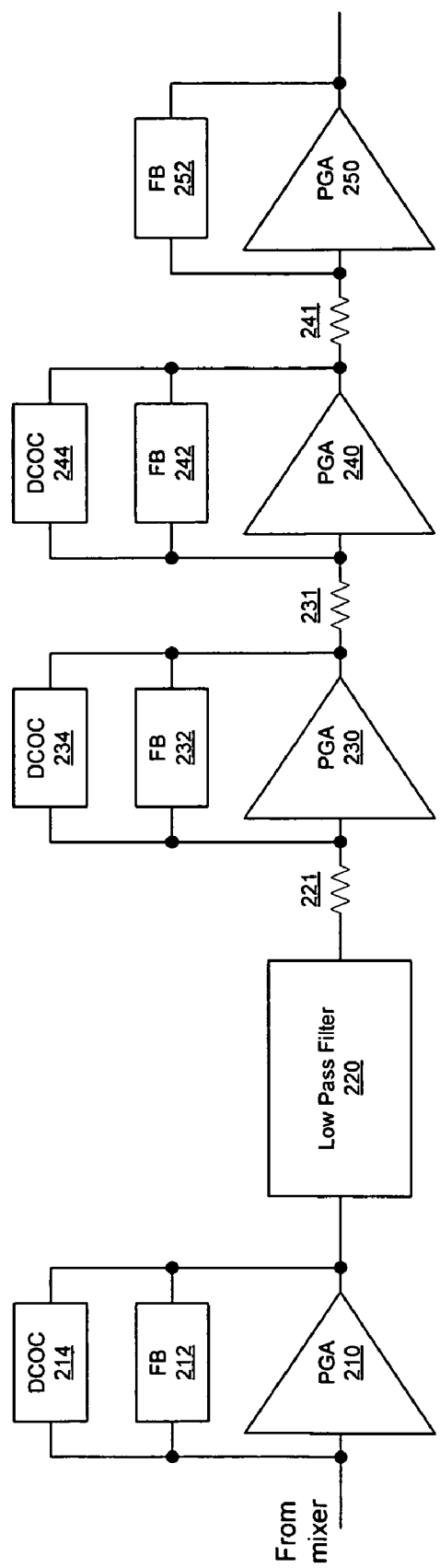
FIG. 2a illustrates an exemplary block diagram for DC offset correction, in accordance with an embodiment of the invention.

FIG. 2a illustrates an exemplary block diagram for DC offset correction, in accordance with an embodiment of the invention. Referring to FIG. 2a, there is shown programmable gain amplifiers (PGA) 210, 230, 240, and 250, a low-pass filter block 220, feedback circuitry (FB) 212, 232, 242, and 252, and DC offset correction circuitry (DCOC) 214, 234, and 244. The FB 212, 232, 242, and 252 may be associated with the PGA 210, 230, 240, and 250, respectively. The DCOC 214, 234, and 244 may be associated with the PGA 210, 230, and 240, respectively.

The PGA 210 may have as inputs a baseband signal from, for example, the mixer 152a, 152b, 154a, or 154b, and feedback signals via the FB 212 and the DCOC 214. The output of the PGA 210 may be coupled to an input of the FB 212, an input of the DCOC 214, and an input of the low pass filter block 220. The output of the low pass filter block 220 may be communicated to an input of the PGA 230 via a resistor 221.

The PGA 230 may have as inputs the filtered baseband signal from the low pass filter block 220, and feedback signals via the FB 232 and the DCOC 234. The output of the PGA 230 may be coupled to an input of the FB 232, an input of the DCOC 234, and to a first terminal of a resistor 231. A second terminal of the resistor 231 may be directly electrically coupled to an input of the PGA 240. The PGA 240 may also have as inputs feedback signals via the FB 242 and the DCOC 244.

The output of the PGA 240 may be coupled to an input of the FB 242, an input of the DCOC 244, and to a first terminal of a resistor 241. The second terminal of the resistor 241 may be directly electrically coupled to an input of the PGA 250. The PGA 250 may also have an input feedback signal via the FB 252.

The PGA 210, 230, 240, and 250 may comprise suitable circuitry and/or logic that may enable signal amplification. An embodiment of the invention may utilize, for example, a differential input amplifier with differential outputs for PGA 210, 230, 240, or 250. A mobile terminal, such as, for example, the mobile terminal 120, may receive signals at different strengths depending on various factors. Exemplary factors may comprise distance from the transmitting source, the obstacles between the transmitting source and the mobile terminal, and absorption and/or reflection of the transmitted signals by the obstacles. Accordingly, it may be desirable to have programmable gain amplifiers that may amplify the received signals to a substantially constant baseband signal strength.

The low pass filter block 220 may comprise suitable logic and/or circuitry that may enable attenuation of frequencies above a desired range of frequencies. The low pass filter block 220 may be a variable low-pass filter, which may be utilized to control the cut-off frequency. U.S. application Ser. No. 11/385,389, which is filed on the even date herewith and is incorporated herein by reference in its entirety, discloses the low pass filter block 220.

The FB 212, 232, 242, and 252 may be utilized by the PGA 210, 230, 240, and 250, respectively. Generally, an amplifier may have a constant gain-bandwidth value. Therefore, as the gain changes, the bandwidth may change inversely. However, it may be desirable to keep the bandwidth constant regardless of the change in gain. Accordingly, as a gain of a PGA is changed, the corresponding feedback circuitry FB 212, 232, 242, or 252 may also be configured to keep the bandwidth of the PGA constant. The configuration of the feedback circuitry FB 212, 232, 242, and 252, and the gain of the PGA 210, 230, 240, and 250 may be controlled by, for example, the processor 125.

Figure 2B:
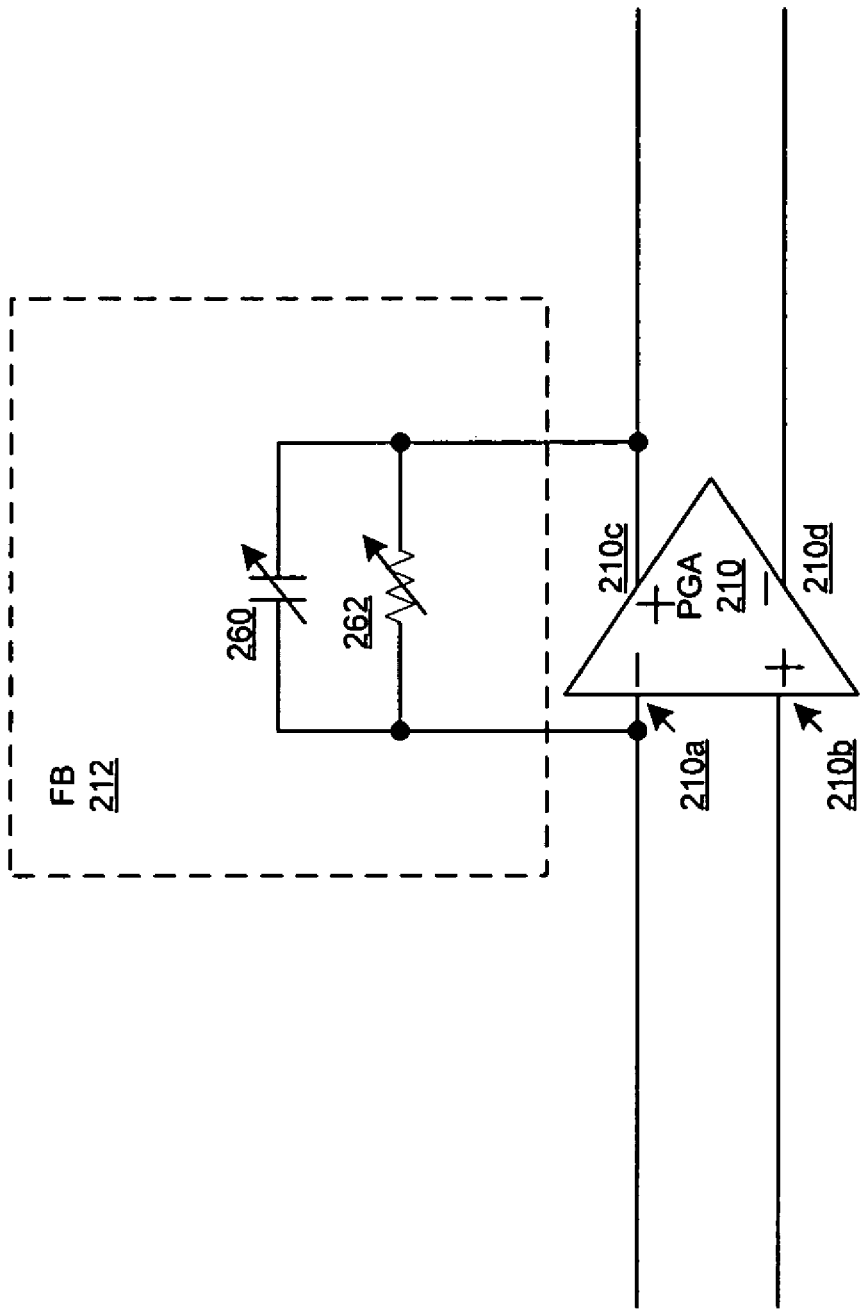
FIG. 2b illustrates exemplary feedback circuitry for a programmable gain amplifier, which may be utilized in connection with an embodiment of the invention.

FIG. 2b illustrates exemplary feedback circuitry for a programmable gain amplifier, which may be utilized in connection with an embodiment of the invention. Referring to FIG. 2b, there is shown the PGA 210 and the FB 212. The PGA 210 may be a differential input amplifier with inputs 210a and 210b, and outputs 210c and 210d. The input 210a may be a negative input and the input 210b may be a positive input. The output 210c may be a positive output and the input 210d may be a negative output. The FB 212 may be, for example, a parallel resistor-capacitor (RC) network comprising a variable capacitor 260 and variable resistor 262.

The FB 212 may be configured by changing a capacitance of the variable capacitor 260 and/or a resistance of the variable resistor 262 to keep constant an amplifying bandwidth of the PGA 210, regardless of changes in the gain of the PGA 210. The gain of the PGA 210 and changes to the variable capacitor 260 and the variable resistor 262 may be controlled by, for example, the processor 125.

In operation, differential input signals may be communicated to the input 210a and 210b, and the feedback signals from the FB 212 may also be communicated to the inputs 210a and 210b. Accordingly, the feedback signals from the FB 212 may be used for controlling amplification of the input signals at the inputs 210a and 210b, which may result in desired output signals at the outputs 210c and 210d of the PGA 210. The output signals may be amplified by a desired gain for the frequency range of, for example, substantially from 1 KHz to 8 MHz.

Figure 2C:
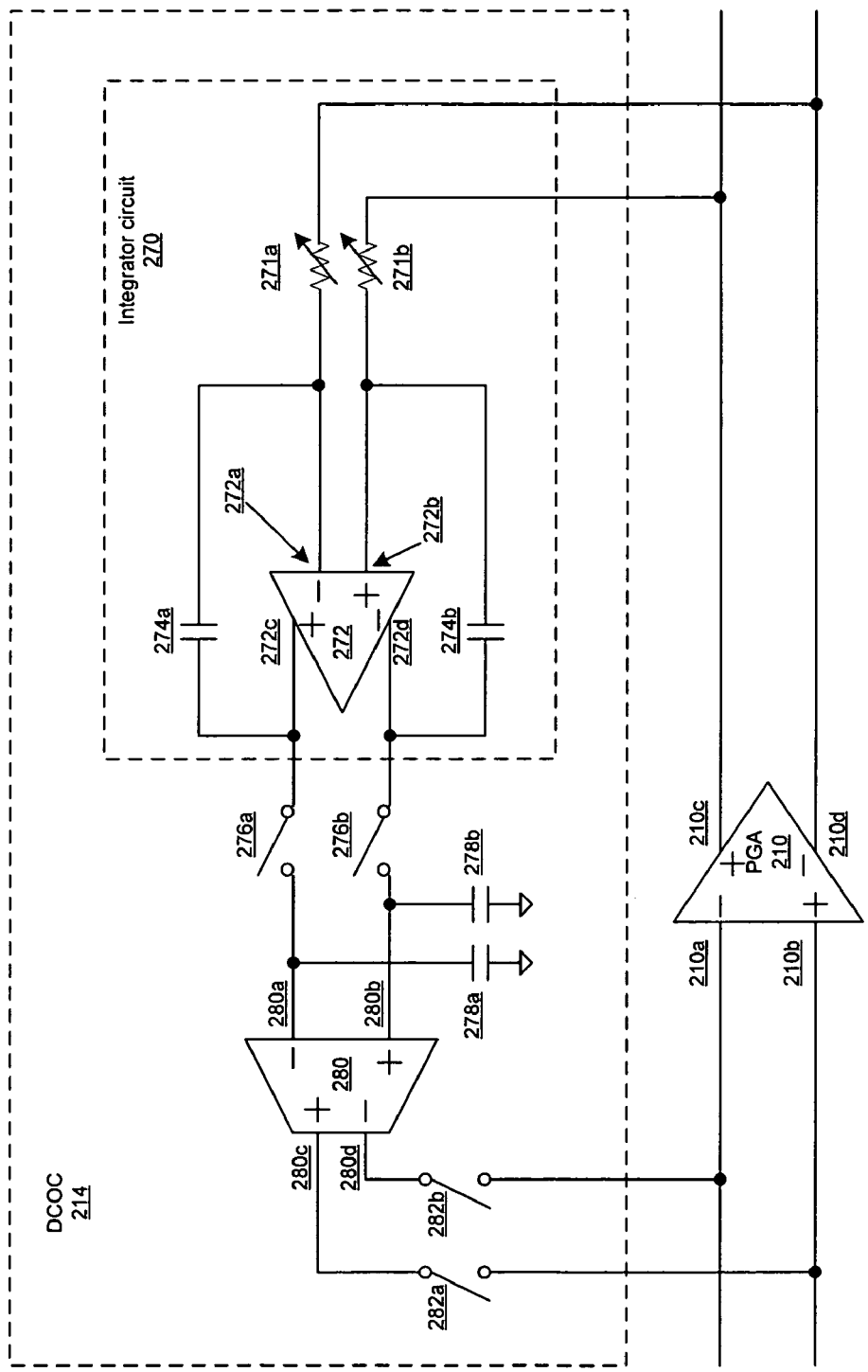
FIG. 2c illustrates exemplary feedback circuitry for DC offset correction for a programmable gain amplifier, in accordance with an embodiment of the invention.

FIG. 2c illustrates exemplary feedback circuitry for DC offset correction for a programmable gain amplifier, in accordance with an embodiment of the invention. Referring to FIG. 2c, there is shown the PGA 210 and the DCOC 214. The DCOC 214 comprises an integrator circuit 270, capacitors 278a and 278c, switches 276a, 276b, 282a, and 282b, and a transconductor device 280. The integrator circuit 270 comprises variable resistors 271a and 271b, an amplifier 272, and capacitors 274a and 274b.

The integrator circuit 270 may integrate the difference between the signals from the outputs 210c and 210d of the amplifier 210. The variable resistors 271a and 271b may be configured for various resistances by, for example, the processor 125. The change in resistance of the variable resistors 271a and 271b may change the corner frequency of the RC filters formed by the variable resistor 271a and the capacitor 274a, and variable resistor 271b and the capacitor 274b. The corner frequency may define the high pass corner frequency of, for example, the PGA 210 and DCOC 214.

The highpass corner frequency may be used to determine a damping of the feedback signal that may be used to correct the DC offset. For example, if a higher highpass corner frequency is allowed, the DC offset correction signal at the output of the DCOC 214 may be proportional to an integration of a DC offset that may be changing rapidly. If a lower highpass corner frequency is allowed, the DC offset correction signal at the output of the DCOC 214 may be proportional to an integration of a damped DC offset signal. An exemplary embodiment of the invention may use, for example, 20 KHz for the higher highpass corner frequency and 1 KHz for the lower highpass corner frequency.

The inputs of the DCOC 214 may be directly coupled to the outputs of the PGA 210, and the outputs of the DCOC 214 may be directly coupled to the inputs of the PGA 210. For example, the output 210c may be directly electrically coupled to a first terminal of the variable resistor 271b, and the output 210d may be directly electrically coupled to a first terminal of the variable resistor 271a. The input 210a of the PGA 210 may also be directly electrically coupled, for example, to a first terminal of the switch 282b, and the input 210b of the PGA 210 may also be directly electrically coupled, for example, to a first terminal of the switch 282a. The DCOC 214 may provide DC correction signals that may be used to cancel at least some of the DC offset in the input baseband signals.

A first input signal to the DCOC 214, for example, from the output 210d of the PGA 210, may be communicated to a first terminal of the variable resistor 271a, and a second terminal of the variable resistor 271a may be coupled to a negative input 272a of the amplifier 272 and to a first terminal of the capacitor 274a. The amplifier 272 may be, for example, a differential input amplifier with differential outputs. The second terminal of the capacitor 274a may be coupled to the output 272c of the amplifier 272 and to a first terminal of the switch 276a.

A second input signal to the DCOC 214, for example, from the output 210c of the PGA 210, may be communicated to a first terminal of the variable resistor 271b, and a second terminal of the variable resistor 271b may be coupled to a negative input 272b of the amplifier 272 and to a first terminal of the capacitor 274b. The second terminal of the capacitor 274b may be coupled to the output 272d of the amplifier 272 and to a first terminal of the switch 276b. Accordingly, the amplifier 272, the capacitors 274a and 274b, and the variable resistors 271a and 271b may comprise an integrator circuit that may integrate a difference of the input signals. The switches 276a and 276b may be either in an open position or a closed position.

A second terminal of the switch 276a may be coupled to a first terminal of the capacitor 278a and to an input 280a of the transconductor device 280. The second terminal of the capacitor 278a may be coupled to ground. Similarly, a second terminal of the switch 276b may be coupled to a first terminal of the capacitor 278b and to an input 280b of the transconductor device 280. The second terminals of the capacitor 278a and 278b may be coupled to ground. The outputs 280c and 280d of the transconductor device 280 may be coupled to a first terminal of the switches 282a and 282b, respectively. The switches 282a and 282b may be either in an open position or a closed position.

The transconductor device 280 may comprise suitable circuitry and/or logic that may enable receiving of voltages at high-impedance inputs and outputting current outputs that may be proportional to the voltages at the high-impedance inputs.

In operation, the switches 276a and 276b may be in a closed position and the switches 282a and 282b may also be in a closed position. The variable resistor 271a and 271b may be configured for a higher highpass corner frequency, for example, 20 KHz. Accordingly, the integrator circuit 270 may integrate the difference of the input signals to the amplifier 272, and the differential outputs of the integrator circuit 270 may charge the capacitors 278a and 278b.

The currents may be communicated to the inputs 210a and 210b of the PGA 210 to reduce DC offset at the outputs of the PGA 210.

The switches 276a and 276b may also be opened to hold the voltages at the capacitors 278a and 278b to a substantially constant value. Accordingly, the outputs of the transconductor device 280 may be substantially constant current, and the outputs of the PGA 210 may have a constant reduction in the amount of DC offset. This may be described with respect to FIG. 3a.

Figure 3A:
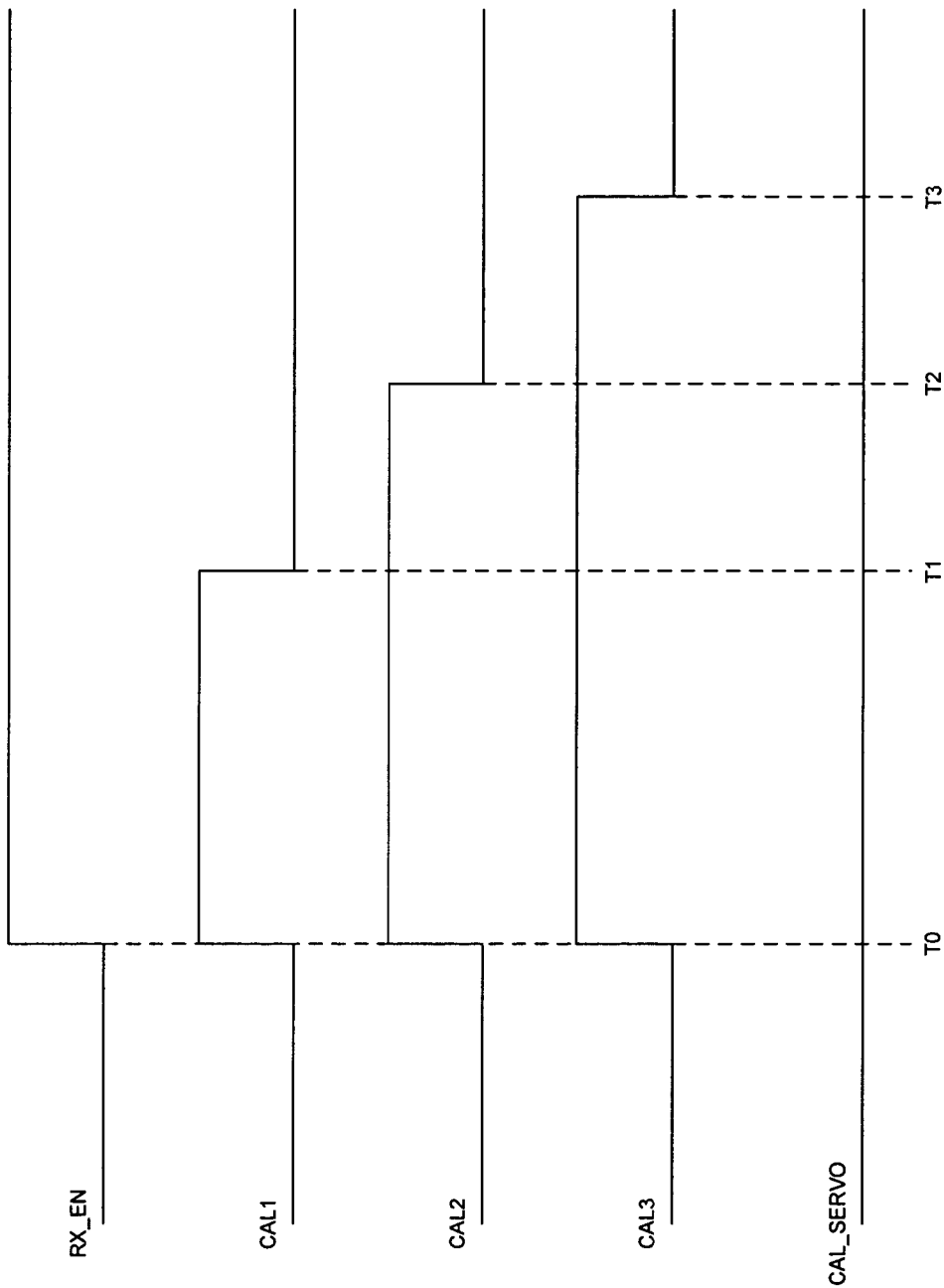
FIG. 3a illustrates an exemplary DC offset correction timing diagram, in accordance with an embodiment of the invention.

FIG. 3a illustrates an exemplary DC offset correction timing diagram, in accordance with an embodiment of the invention. Referring to FIG. 3a, there is shown RX_EN signal, CAL1 signal, CAL2 signal, CAL3 signal, and CAL_SERVO signal. When the CAL_SERVO signal is deasserted, the DCOC 214, 234, and 244 may operate in a hold mode. In the hold mode, the DCOC 214, 234, and 244 may generate a DC offset correction signals, and the offset correction signals may be held constant after a certain amount of time. When CAL_SERVO signal is deasserted, and CAL1 signal, CAL2 signal, or CAL3 signal is also deasserted, the amplifier 272 for the respective DCOC 214, 234, or 244 may be configured to be turned off. Accordingly, this may reduce power used by, for example, the mobile terminal 120.

At time instant T0, the CAL_SERVO signal may be deasserted. This may indicate that the highpass corner frequency for the DCOC 214, 234, and 244 may be a higher frequency, for example, 20 KHz. At time instant T0, the receive enable signal RX_EN may be asserted. The assertion of this signal may, for example, enable operation of the DCOC 214, 234, and 244. At time instant T0, the CAL1, CAL2, and CAL3 signals may also be asserted. The switches 276a and 276b in each of the DCOC 214, 234, and 244 may also be in the closed position, thus allowing the capacitors 278a and 278b to be charged by outputs of the amplifier 272 in the DCOC 214,

234, and 244. The switches 282*a* and 282*b* in each of the DCOC 214, 234, and 244 may be in the closed position.

The capacitors 278*a* and 278*b* in the DCOC 234 may charge to a voltage output by the amplifier 272 in the DCOC 214. At time instant T1, the CAL1 signal may be deasserted. Since the CAL_SERVO signal is also deasserted, this may indicate that the DCOC 214 may operate in a hold mode. Accordingly, the switches 276*a* and 276*b* in the DCOC 214 may be switched to the open position, and the voltages at the capacitors 278*a* and 278*b* in the DCOC 214 may not change. Any leakage that may exist in the circuit may be ignored to simplify description. The switches 282*a* and 282*b* in the DCOC 214 may be in the closed position. Accordingly, the output currents of the transconductor device 280 in the DCOC 214 may be communicated to inputs of the PGA 210. The PGA 210 may then output amplified signals that may be corrected for DC offset. These signals may be filtered by the low pass filter block 220, and then communicated to the PGA 230. Since the CAL_SERVO signal and the CALL signal are deasserted, the amplifier 272 in the DCOC 214 may be turned off.

The capacitors 278*a* and 278*b* in the DCOC 234 may charge up to a voltage output by the amplifier 272 in the DCOC 234. At time instant T2, the CAL2 signal may be deasserted. Since the CAL_SERVO signal is also deasserted, this may indicate that the DCOC 234 may operate in a hold mode. Accordingly, the switches 276*a* and 276*b* in the DCOC 234 may be switched to the open position, and the voltage at the capacitors 278*a* and 278*b* in the DCOC 234 may not change. Any leakage that may exist in a circuit may be ignored to simplify description. The switches 282*a* and 282*b* in the DCOC 234 may be in the closed position. Accordingly, the output currents of the transconductor device 280 in the DCOC 234 may be communicated to inputs of the PGA 230. The PGA 230 may then output amplified signals, which may comprise a corrected DC offset. These signals may be communicated to the PGA 240. Since the CAL_SERVO signal and the CAL2 signal are deasserted, the amplifier 272 in the DCOC 234 may be turned off.

The capacitors 278*a* and 278*b* in the DCOC 244 may charge to a voltage output by the amplifier 272 in the DCOC 244. At time instant T3, the CAL2 signal may be deasserted. Since the CAL_SERVO signal is also deasserted, this may indicate that the DCOC 244 may operate in a hold mode. Accordingly, the switches 276*a* and 276*b* in the DCOC 244 may be switched to the open position, and the voltage at the capacitors 278*a* and 278*b* in the DCOC 244 may not change. Any leakage that may exist in the circuit may be ignored to simplify description. The switches 282*a* and 282*b* in the DCOC 244 may be in the closed position. Accordingly, the output currents of the transconductor device 280 in the DCOC 244 may be communicated to inputs of the PGA 240. The PGA 240 may then output differential amplified signals that may be corrected for DC offset. These signals may be communicated to the PGA 250. Since the CAL_SERVO signal and the CAL3 signal are deasserted, the amplifier 272 in the DCOC 244 may be turned off.

Figure 3B:
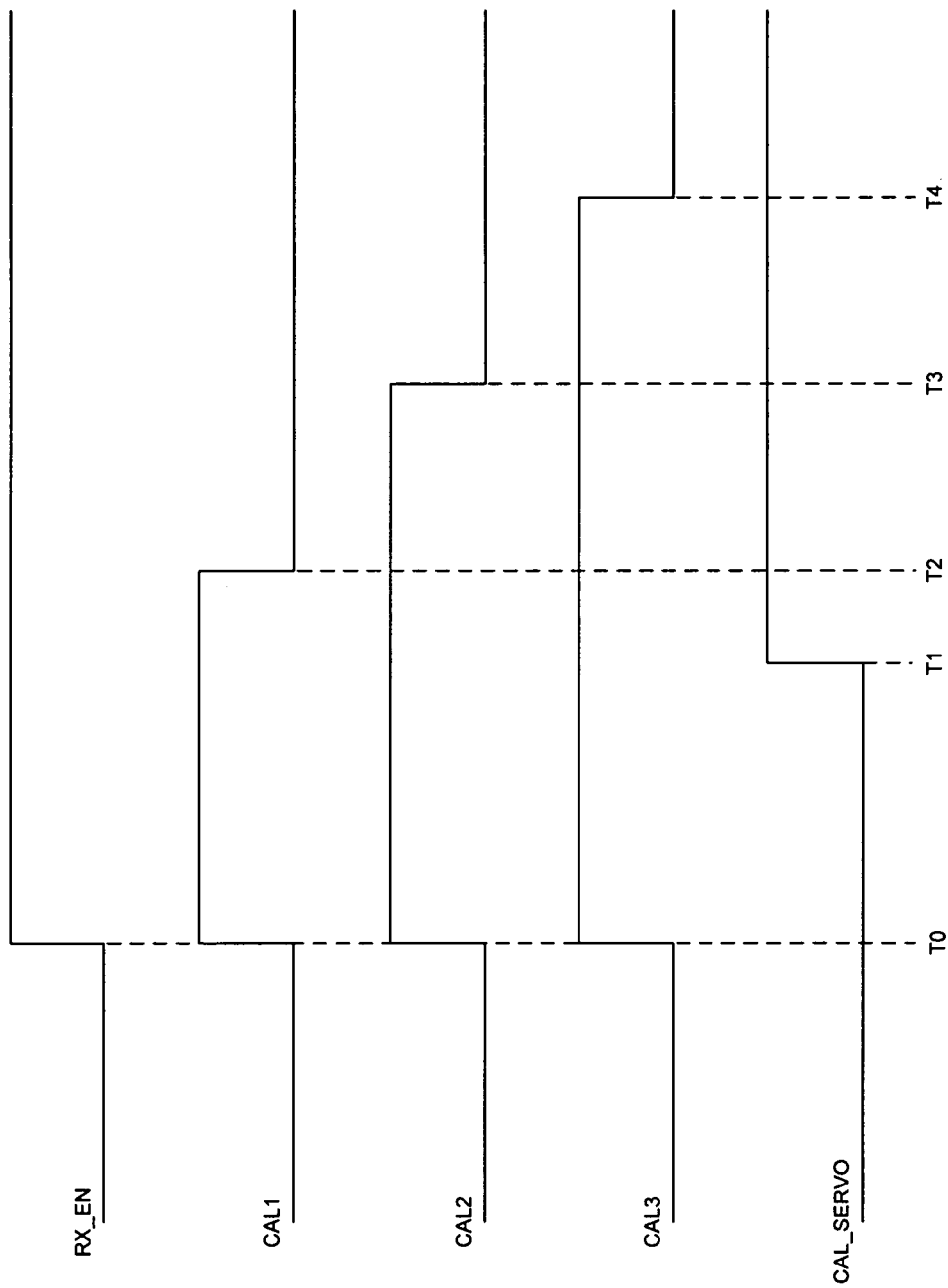
FIG. 3b illustrates an exemplary DC offset correction timing diagram, in accordance with an embodiment of the invention.

FIG. 3*b* illustrates an exemplary DC offset correction timing diagram, in accordance with an embodiment of the invention. Referring to FIG. 3*b*, there is shown RX_EN signal, CALL signal, CAL2 signal, CAL3 signal, and CAL_SERVO signal. When the CAL_SERVO signal is asserted, the DCOC 214, 234, and 244 may operate in a continuous mode. In the continuous mode, the DCOC 214, 234, and 244 may generate a DC offset correction signal, and this signal may be updated continuously. When CAL_SERVO signal is asserted, regardless of whether the CAL1 signal, CAL2 signal, or the CAL3 signal is asserted, the amplifier 272 for the respective DCOC 214, 234, or 244 may be configured to be turned on.

At time instant T0, the CAL_SERVO signal may be deasserted. Accordingly, the highpass corner frequency for the DCOC 214, 234, and 244 may be a higher frequency, for example, 20 KHz. At time instant T0, the receive enable signal RX_EN may be asserted. The assertion of this signal may, for example, enable operation of the DCOC 214, 234, and 244. At time instant T0, the CAL1, CAL2, and CAL3 signals may also be asserted. The switches 276*a* and 276*b* in each of the DCOC 214, 234, and 244 may also be in the closed position, thus allowing communication of the outputs of the amplifier 272 in the DCOC 214, 234, and 244 to inputs of the transconductor device 280. The switches 282*a* and 282*b* in each of the DCOC 214, 234, and 244 may be in the closed position.

At time instant T1, the CAL_SERVO signal may be asserted. Accordingly, this may indicate a continuous mode operation for the DCOC 214, 234, and 244. At time instant T2, the CAL1 signal may be deasserted. Since the CAL_SERVO signal may be asserted, the DCOC 214 may operate in the continuous mode. Accordingly, the switches 276*a* and 276*b* in the DCOC 214 may remain in the closed position, and voltages at the capacitors 278*a* and 278*b* in the DCOC 214 may change with the signals communicated by the amplifier 272 in the DCOC 214. The switches 282*a* and 282*b* in the DCOC 214 may be in the closed position. Accordingly, the output currents of the transconductor device 280 in the DCOC 214 may be communicated to the inputs of the PGA 210. The PGA 210 may then output amplified signals that may be corrected for DC offset. These signals may be filtered by the low pass filter block 220, and then communicated to the PGA 230. The variable resistors 271*a* and 271*b* in the DCOC 214 may also be configured for a lower highpass corner frequency, for example, 1 KHz. The lower highpass corner frequency may give a damped response in integrating the outputs of the PGA 210.

At time instant T3, the CAL2 signal may be deasserted. Since the CAL_SERVO signal may be asserted, the DCOC 234 may operate in the continuous mode. Accordingly, the switches 276*a* and 276*b* in the DCOC 234 may remain in the closed position, and the voltages at the capacitors 278*a* and 278*b* in the DCOC 234 may change with the signals communicated by the amplifier 272 in the DCOC 234. The switches 282*a* and 282*b* in the DCOC 234 may be in the closed position. Accordingly, the output currents of the transconductor device 280 in the DCOC 234 may be communicated to inputs of the PGA 230. The PGA 230 may then output amplified signals that may be corrected for DC offset. These signals may be communicated to the PGA 240. The variable resistors 271*a* and 271*b* in the DCOC 234 may also be configured for a lower highpass corner frequency, for example, 1 KHz. The lower highpass corner frequency may give a damped response in integrating the outputs of the PGA 230.

At time instant T4, the CAL3 signal may be deasserted. Since the CAL_SERVO signal may be asserted, the DCOC 244 may operate in the continuous mode. Accordingly, the switches 276*a* and 276*b* in the DCOC 244 may remain in the closed position, and the voltages at the capacitors 278*a* and 278*b* in the DCOC 244 may change with the signals communicated by the amplifier 272 in the DCOC 244. The switches 282*a* and 282*b* in the DCOC 244 may be in the closed position. Accordingly, the output currents of the transconductor device 280 in the DCOC 244 may be communicated to inputs of the PGA 240. The PGA 240 may then output amplified signals that may be corrected for DC offset. These signals may be communicated to the PGA 250. The variable resistors 271a and 271b in the DCOC 244 may also be configured for a lower highpass corner frequency, for example, 1 KHz. The lower highpass corner frequency may give a damped response in integrating the outputs of the PGA 240.

Figure 4:
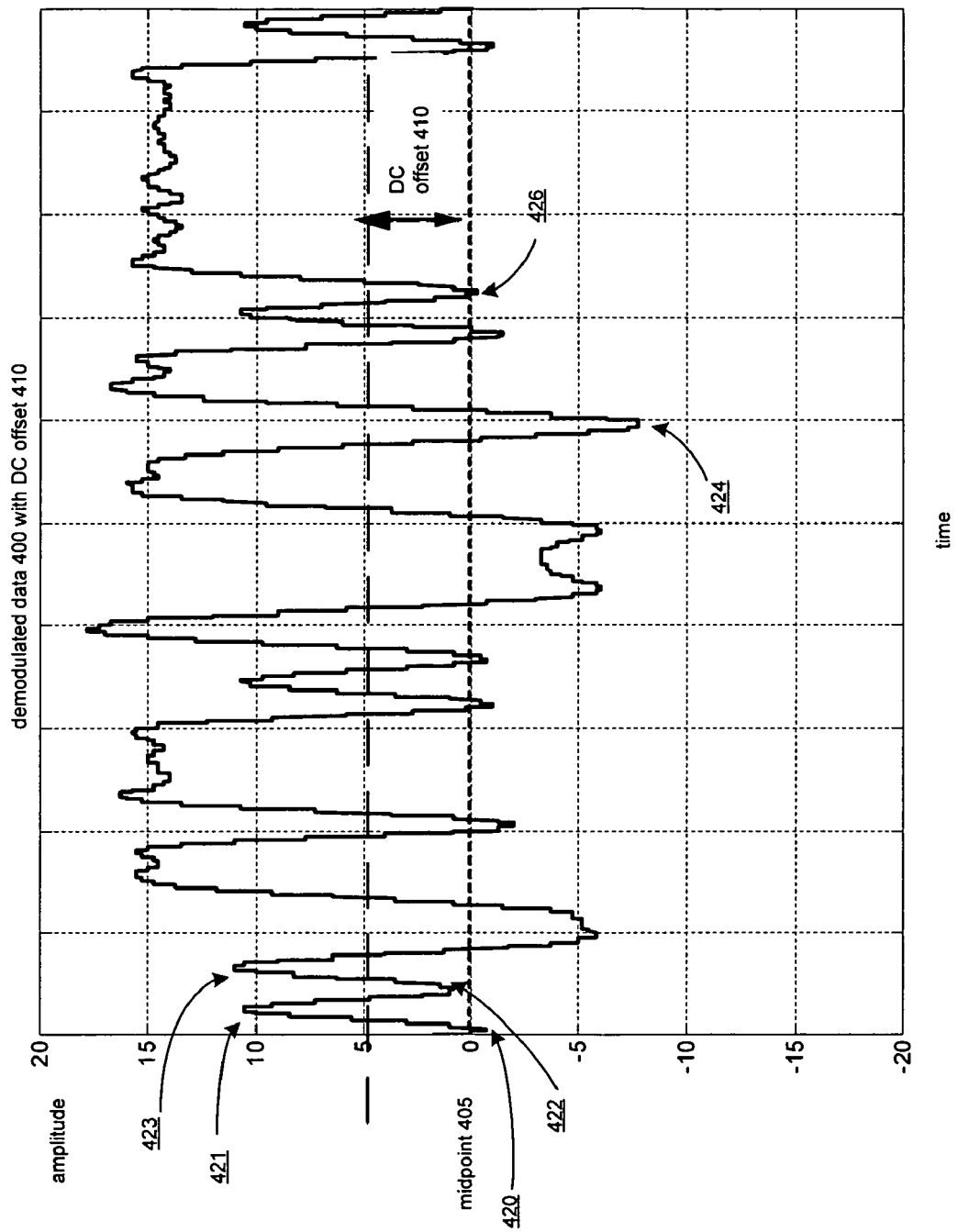
FIG. 4 illustrates a graphical representation of exemplary demodulated data without DC offset correction, which may be utilized in connection with an embodiment of the invention.

FIG. 4 illustrates a graphical representation of exemplary demodulated data without DC offset correction, which may be utilized in connection with an embodiment of the invention. Referring to FIG. 4, there is shown a simple, demodulated analog baseband data 400 with a nominal midpoint 405, and a positive DC offset 410. This simplified example is used to point out adverse effects of a DC offset.

There is also shown peaks 421 and 423, and valleys 420, 422, 424, and 426 of the demodulated analog data 400. In this simplified example, a peak of the demodulated analog data 400 above the nominal midpoint 405 may be interpreted as a logical 1 and a valley of the demodulated analog data 400 below the nominal midpoint 405 may be interpreted as a logical 0. Since the DC offset 410 is a positive DC offset, peaks may generally not be affected. That is, a logical 1 transmitted by a transmitting device may still be interpreted as a logical 1 by the receiving device, for example, the mobile terminal 120. For example, the peaks such as the peaks 421, 423 may still be interpreted as logical 1s.

Even after the signal is modified by the positive DC offset 410, the valley 424 may still be sufficiently below the nominal midpoint 405 to be interpreted as a logical 0. However, valleys such as, for example, 420, 422, and 426 may be adversely affected. The positive DC offset 410 may raise the valley 422 above a threshold such that it may be incorrectly interpreted as a 1. The valleys 420 and 426, which may be right about the nominal midpoint 405, may be interpreted correctly as a logical 0 at times and incorrectly as a logical 1 at other times.

Additionally, the increased amplitude of the demodulated analog baseband data 400 may lead to saturation, which may result in excess power drain and possible stressing of circuitry, such as, for example, the PGA 210, 230, 240, and 250, and the low pass filter 220. Accordingly, it may be desirable to remove the DC offset 410 to be able to interpret received data correctly, to reduce power used by a receiving device, and to extend the lives of various circuitry components.

Figure 5:
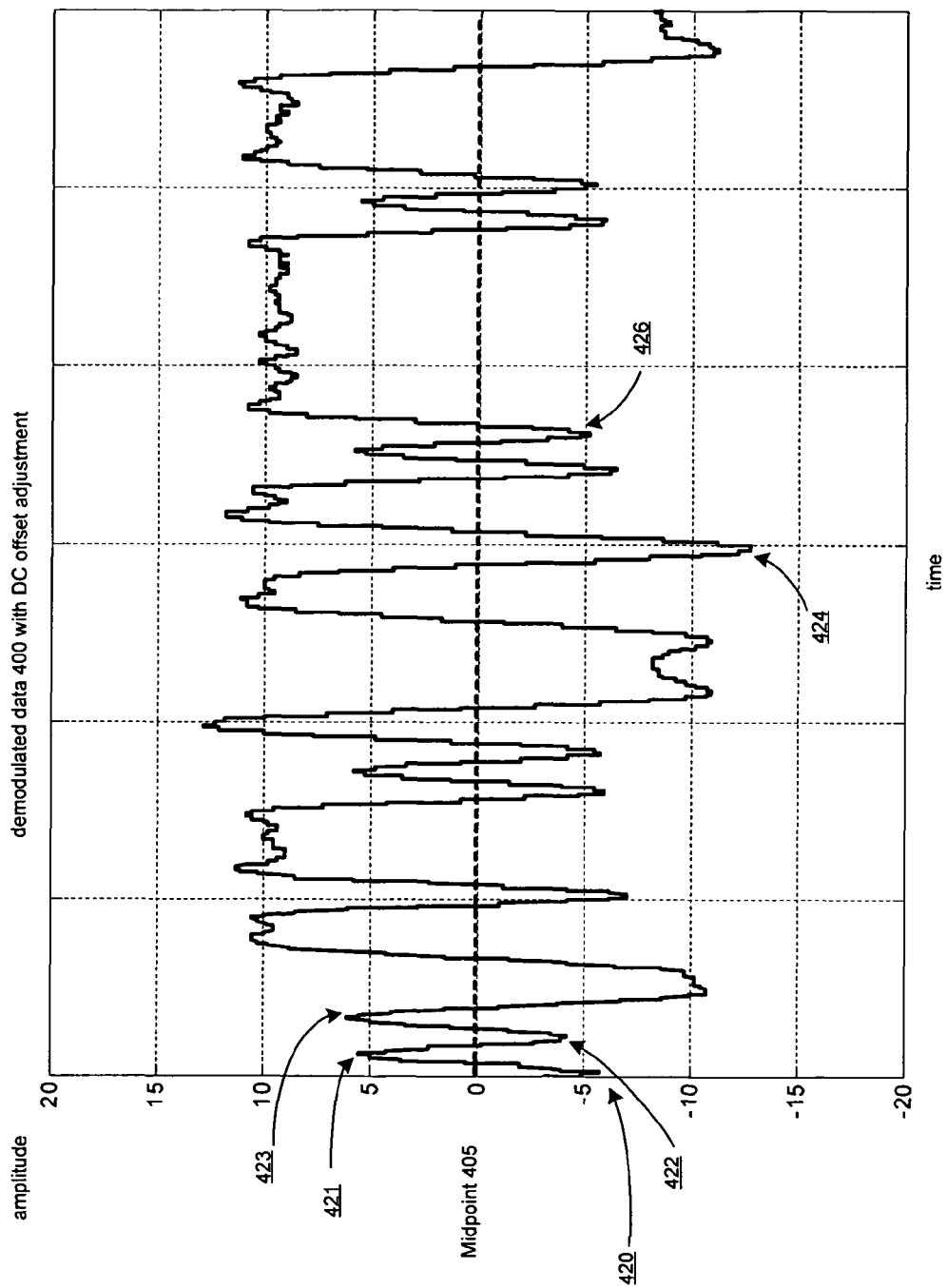
FIG. 5 illustrates a graphical representation of exemplary demodulated data with DC offset correction, in accordance with an embodiment of the invention.

FIG. 5 illustrates a graphical representation of exemplary demodulated data with DC offset correction, in accordance with an embodiment of the invention. Referring to FIG. 5, there is shown the demodulated data 400 that is produced after the DC offset is removed. The DC offset may be removed, for example, by the DCOC circuitry 214, 234, and 244 associated with the PGAs 210, 230, and 240, respectively.

In this particular example, a beginning of the demodulated data 400 may include a preamble that comprises the peaks and valleys 420, 421, 422, and 423, which has a particular pattern. In this example, the pattern may be, for example, 0101. Accordingly, since the demodulated data 400 may have been corrected for a DC offset, the peaks and valleys 420, 421, 422, and 423 may be correctly interpreted to be logical 0, logical 1, logical 0, and logical 1. Additionally, the valleys 424 and 426 may also be correctly interpreted to be logical 0s. Also, since the signal levels may be within a desired range for the various circuitry components, there may not be excess power drain or component stressing due to saturation.

Figure 6:
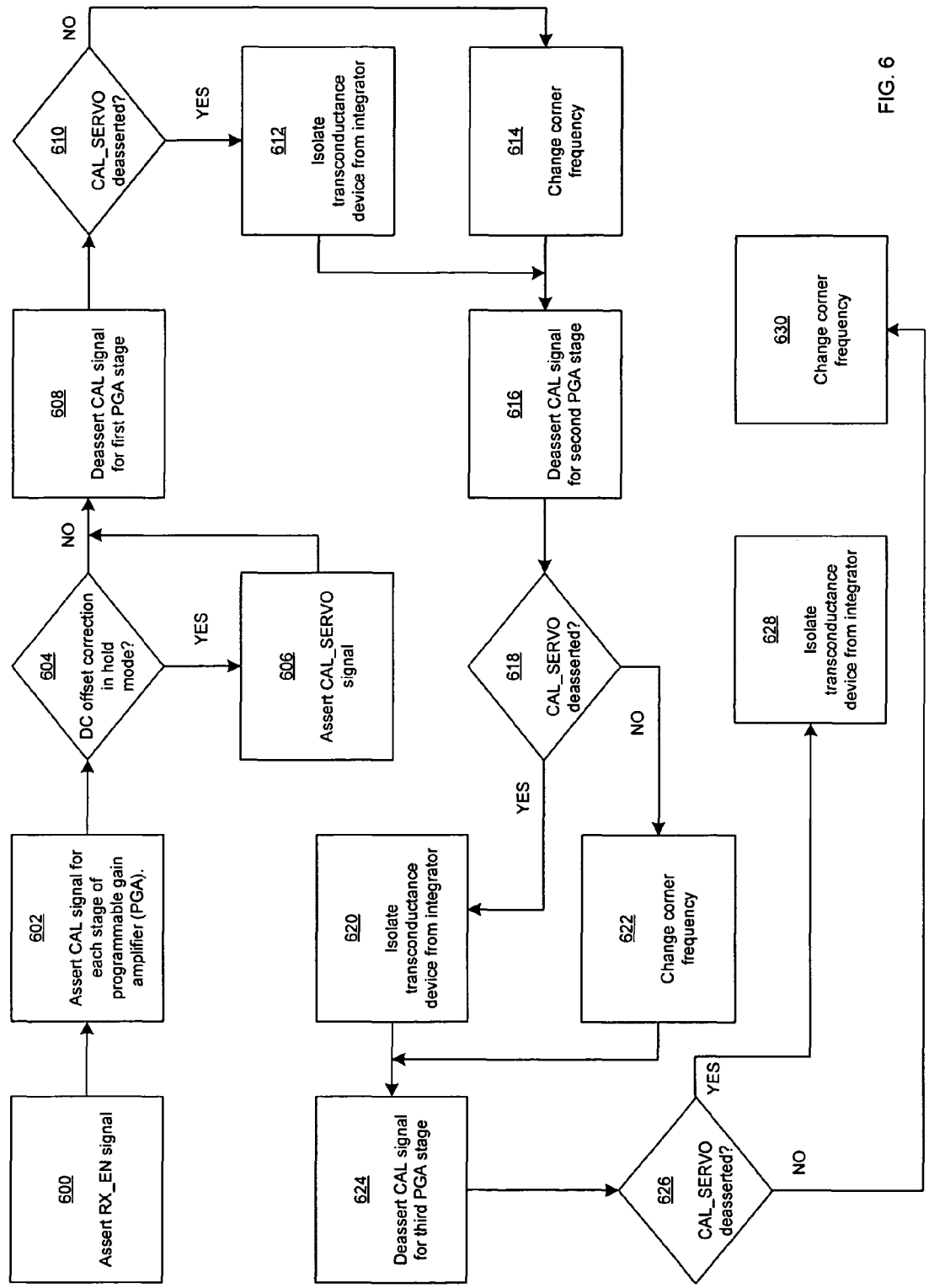
FIG. 6 is a flow diagram illustrating an exemplary routine for correcting DC offset, in accordance with an embodiment of the invention.

FIG. 6 is a flow diagram illustrating an exemplary routine for correcting DC offset, in accordance with an embodiment of the invention. Referring to FIG. 6, in step 600, the RX_EN signal may be asserted, and CAL_SERVO signal may remain deasserted. The assertion of the RX_EN signal may indicate that various functionalities for the receiver portion of the mobile handset device may be enabled so that they may operate. The deasserted CAL_SERVO signal may indicate that the DCOC 214, 234, and 244 may operate in the hold mode.

In step 602, the CAL1, CAL2, and CAL3 signals may be asserted. This may allow the DCOC 214, 234, and 244 to be operational since the RX_EN signal may be asserted. Accordingly, the DCOC 214, 234, and 244 may integrate the output of each of the PGA 210, 230, and 240, respectively. The DCOC 214, 234, and 244 may use a higher highpass corner frequency while the CALL signal, CAL2 signal, and CAL3 signal, respectively, are asserted. In each of the DCOC 214, 234, and 244, the switches 276a and 276b may be in the closed state to allow the capacitors 278a and 278b to be charged by the voltages from the amplifier 272. The switches 282a and 282b in each of the DCOC 214, 234, and 244 may be in the closed state so that the outputs of the transconductor device 280 in each of the DCOC 214, 234, and 244 may be communicated to the inputs of the PGA 210, 230, or 240, respectively.

In step 604, if the DC offset correction is to operate in a hold mode, the next step may be step 608. If the DC offset correction is to operate in a continuous mode, the next step may be step 606. In step 606, the CAL_SERVO signal may be asserted. This may indicate that the DCOC 214, 234, and 244 may operate in a continuous mode. In step 608, the CALL signal may be deasserted for the corresponding PGA 214. In step 610, if the CAL_SERVO signal is deasserted, the next step may be step 612. Otherwise, the next step may be step 614.

In step 612, the switches 276a and 276b in the DCOC 214 may be opened, thereby isolating the capacitors 278a and 278b in the DCOC 214 from further changes at the outputs of the amplifier 272 in the DCOC 214. The amplifier 272 in the DCOC 214 may be powered down to conserve power. The switches 282a and 282b in the DCOC 214 may be closed, thereby allowing the outputs of the transconductor device 280 in the DCOC 214 to be communicated to the inputs of the PGA 210. The next step may be step 616.

In step 614, the variable resistors 271a and 271b in the DCOC 214 may be adjusted to change the highpass corner frequency to a lower frequency, for example, from, for example, 20 KHz to 1 KHz. Accordingly, the outputs of the amplifier 272 in the DCOC 214 may be integration of a portion of the output signals from the PGA 210, where the frequencies of the output signals integrated may be approximately 1 KHz or less, for example. The switches 282a and 282b in the DCOC 214 may be closed, thereby allowing the outputs of the transconductor device 280 in the DCOC 214 to be communicated to the inputs of the PGA 210.

In step 616, the CAL2 signal may be deasserted for the corresponding PGA 230. In step 618, if the CAL_SERVO signal is deasserted, the next step may be step 620. Otherwise, the next step may be step 622. In step 620, the switches 276a and 276b in the DCOC 234 may be opened, thereby isolating the capacitors 278a and 278b in the DCOC 234 from further changes at the outputs of the amplifier 272 in the DCOC 234. The amplifier 272 in the DCOC 234 may be powered down to conserve power. The switches 282a and 282b in the DCOC 234 may be closed, thereby allowing the outputs of the transconductor device 280 in the DCOC 234 to be communicated to the inputs of the PGA 230. The next step may be step 624.

In step 622, the variable resistors 271a and 271b in the DCOC 234 may be adjusted to change the highpass corner frequency to a lower frequency, for example, from 20 KHz to 1 KHz. Accordingly, the outputs of the amplifier 272 in the DCOC 234 may be integration of a portion of the output signals from the PGA 230, where the frequencies of the output signals may be approximately 1 KHz or less. The switch 282 in the DCOC 234 may be closed, thereby allowing the outputs of the transconductor device 280 in the DCOC 234 to be communicated to the inputs of the PGA 230.

In step 624, the CAL3 signal may be deasserted for the corresponding PGA 240. In step 626, if the CAL_SERVO signal is deasserted, the next step may be step 628. Otherwise, the next step may be step 630. In step 628, the switches 276a and 276b in the DCOC 244 may be opened, thereby isolating the capacitors 278a and 278b in the DCOC 244 from further changes at the outputs of the amplifier 272 in the DCOC 244. The amplifier 272 in the DCOC 244 may be powered down to conserve power. The switches 282a and 282b in the DCOC 244 may be closed, thereby allowing the outputs of the transconductor device 280 in the DCOC 244 to be communicated to the inputs of the PGA 240.

In step 630, the variable resistors 271a and 271b in the DCOC 244 may be adjusted in order to change the highpass corner frequency to a lower frequency, for example, from 20 KHz to 1 KHz. Accordingly, the outputs of the amplifier 272 in the DCOC 244 may be integration of a portion of the output signals from the PGA 240, where the frequencies of the output signals may be approximately 1 KHz or less. The switches 282a and 282b in the DCOC 244 may be closed, thereby allowing the outputs of the transconductor device 280 in the DCOC 244 to be communicated to the inputs of the PGA 240.

Although specific timing for signals in the various DC offset correction circuitry, for example, the DCOC 214, 234, and 244, may have been described, the invention need not be so limited. Different embodiments of the invention may allow different timing sequences as to when, for example, the switches 276a, 276b, 282a, and 282b may open or close, and when the variable resistors 271a and 271b may be adjusted to change the highpass corner frequency.

Additionally, the operation of the DC offset correction circuitry may be controlled, for example, by the processor 125 or other circuitry such as a state machine. Configuration data may be stored in memory or registers, by for example, the processor 125. The memory may be, for example, the memory 127. The baseband block 133 may comprise registers that may be configured to control the DC offset circuitry. Various circuitry such as, for example, state machines, may then use the configuration data to control operation of the DC offset correction circuitry.

Configuration data may comprise, for example, information regarding the resistance values for the variable resistors 271a and 271b in the DCOC 214, 234, and 244, when to open and close the switches 276a, 276b, 282a, and 282b, when to assert and deassert the CAL1, CAL2, CAL3, and CAL_SERVO signals.

In accordance with an embodiment of the invention, aspects of an exemplary system may comprise a first circuit, for example, the integrator circuit 270, having a variable corner frequency that generates first differential signals from outputs of an amplifier 210. The system may also comprise a second circuit, for example, the transconductor device 280, which generates second differential signals from the first differential signals, where the second differential signals may be communicated to an input of the amplifier 210 to remove at least a portion of a DC offset from an output of the amplifier 210. With reference to FIG. 2c, the first circuit may comprise components 271a, 271b, 272, 274a, and 274b. The second circuit may comprise components 278a, 278b, and 280. A resistance of variable resistors 271a and 271b integrated within the first circuit may be changed to vary the variable corner frequency.

The DC offset may be removed from a single stage amplifier or from each stage of a N stage amplifier. An exemplary multistage amplifier is illustrated in FIG. 2c. For example, outputs of a first stage amplifier may be electrically coupled to inputs of a second stage amplifier, and outputs of the second stage amplifier may be electrically coupled to inputs of a third stage amplifier, and at least a portion of DC offset may be removed from an output of each of the three stages.

The first circuit may comprise an integrator circuit 270 that integrates the outputs of the amplifier 210 to generate the first differential signals. The capacitors 278a and 278b in the second circuit may be charged by the first differential signals. The first circuit may be coupled to first terminals of a first switch, where the first switch may be, for example, a double-pole switch, or two single-pole switches. The first switch may comprise switches 276a and 276b. The second terminals of the first switch may be coupled to the second circuit and to the capacitors 278a and 276b. Accordingly, the voltage across the capacitors 278a and 278b may provide a substantially constant first differential signals to the second circuit when the first switch is opened. The second circuit may then generate a substantially constant second differential signals. When the first switch is closed, the first differential signals may be communicated directly to the second circuit.

The first differential signals may be generated by the first circuit using a first corner frequency, and then the first differential signals may be generated by the first circuit using a second corner frequency, where the second corner frequency may be lower than the first corner frequency. Accordingly, this mode of operation for removing DC offset may have the second differential signals that may not be substantially constant since the first differential signals may change continuously.

There may also be a second switch, which may be a double-pole switch, or two single-pole switches 282a and 282b, between the second circuit and the amplifier 210. The second switch may be opened to prevent the second differential signals from being communicated to the amplifier 210.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for processing an electronic signal, the method comprising:
    removing at least a portion of a DC offset from outputs of an amplifier based on:
        first differential signals generated by a first circuit based on said outputs of said amplifier, said first circuit having a variable corner frequency;
        second differential signals generated by a second circuit based on said first differential signals; and
        selectively enabling communication of said first differential signals to enable generation of said second differential signals, wherein said second differential signals are selectively communicated to differential inputs of said amplifier, wherein said first circuit and said second circuit are part of a DC offset correction circuit, wherein said second differential signals represent an output of the DC offset correction circuit, wherein a positive output of said second circuit is coupled to a positive input of said amplifier, and wherein a negative output of said second circuit is coupled to a negative input of said amplifier.

2. The method according to claim 1, comprising adjusting said variable corner frequency by changing a resistance of at least one variable resistor in said first circuit.

3. The method according to claim 1, comprising integrating said outputs of said amplifier via said first circuit to generate said first differential signals.

4. The method according to claim 1, comprising generating said second differential signals from input signals that are substantially constant, wherein said substantially constant input signals are generated from said selectively communicated first differential signals.

5. The method according to claim 4, wherein said substantially constant input signals are voltages generated across capacitors when said capacitors are isolated from said first circuit.

6. The method according to claim 5, wherein said capacitors are said isolated by opening at least one switch between said capacitors and said first circuit.

7. The method according to claim 1, comprising generating said first differential signals using a second corner frequency of said first circuit after generating said first differential signals using a first corner frequency, wherein said second corner frequency is lower than said first corner frequency.

8. The method according to claim 1, comprising removing said at least a portion of said DC offset in each of a plurality of amplifier stages.

9. The method according to claim 1, comprising, in instances when said at least one portion of said DC output does not need to be removed from said outputs of said amplifier, isolating said second differential signals from said differential inputs of said amplifier.

10. The method according to claim 9, wherein said second differential signals are said isolated by opening at least one switch.

11. A system for processing an electronic signal, the system comprising:
    a first circuit that generates first differential signals based on outputs of an amplifier, wherein said first circuit is characterized by a variable corner frequency;
    a switching circuit that selectively enables communication of said first differential signals to a second circuit; and
    said second circuit that generates second differential signals based on selective communication of said first differential signals, wherein said second differential signals are selectively communicated to inputs of said amplifier to remove at least a portion of a DC offset from said outputs of said amplifier, wherein said first circuit and said second circuit are part of a DC offset correction circuit, wherein said second differential signals represent an output of the DC offset correction circuit, wherein a positive output of said second circuit is coupled to a positive input of said amplifier, and wherein a negative output of said second circuit is coupled to a negative input of said amplifier.

12. The system according to claim 11, comprising at least one variable resistor integrated within said first circuit, wherein a resistance of said at least one variable resistor is changed to vary said variable corner frequency.

13. The system according to claim 11, wherein said first circuit comprises an integrating circuit that integrates said outputs of said amplifier to generate said first differential signals.

14. The system according to claim 11, wherein said first switching circuit comprises a first switch coupled between said first circuit and said second circuit, wherein said first switch is opened to provide substantially constant first differential signals from which to generate substantially constant second differential signals.

15. The system according to claim 14, wherein said first switch comprises a double-pole switch.

16. The system according to claim 14, wherein said first switch comprises two single-pole switches.

17. The system according to claim 14, comprising capacitors that are charged to a voltage by a corresponding one of said first differential signals, wherein said substantially constant first differential signals are said voltages when said first switch is opened.

18. The system according to claim 11, wherein said first differential signals are generated at a second corner frequency for said first circuit after said first differential signals are generated at a first corner frequency for said first circuit, wherein said second corner frequency is lower than said first corner frequency.

19. The system according to claim 11, comprising a second switch coupled between said second circuit and said amplifier, wherein said second switch is opened to prevent said second differential signals from being communicated to said amplifier.

20. The system according to claim 19, wherein said second switch comprises a double-pole switch.

21. The system according to claim 19, wherein said second switch comprises two single-pole switches.

22. A system for processing electrical signals, the system comprising:
    an output of a mixer is coupled to an input of a first amplifier stage;
    an output of said first amplifier stage is coupled to an input of a low pass filter;
    an output of said low pass filter is coupled to an input of a second amplifier stage; and
    an output of said second amplifier stage is coupled to a third amplifier stage, wherein each amplifier stage comprises an amplifier, a first circuit, a first switching circuit, a second circuit and a second switching circuit, wherein said first circuit generates first differential signals based on outputs of said amplifier, wherein said second circuit generates second differential signals based on selective communication of said first differential signals, wherein said first circuit is coupled to said second circuit via the first switching circuit, wherein said first circuit and said second circuit are part of a DC offset correction circuit, wherein said second differential signals represent an output of said DC offset correction circuit wherein a positive output of said second circuit is coupled to a positive input of said amplifier via the second switching circuit, and wherein a negative output of said second circuit is coupled to a negative input of said amplifier via the second switching circuit.

23. A method for processing an electronic signal, the method comprising:
removing at least a portion of a DC offset from outputs of an amplifier based on:
first differential signals generated by a first circuit based on said outputs of said amplifier, said first circuit having a variable corner frequency;
substantially constant signals generated by a second circuit based on said first differential signals, wherein said second circuit comprises capacitors and a transconductance device, wherein said substantially constant signals are voltages generated across capacitors when said capacitors are isolated from said first circuit; and
second differential signals generated based on said substantially constant signals, wherein said second differential signals are selectively communicated to differential inputs of said amplifier, wherein said first circuit and said second circuit are part of a DC offset correction circuit, wherein said second differential signals represent an output of the DC offset correction circuit, wherein a positive output of said transconductance device is coupled to a positive input of said amplifier, and wherein a negative output of said transconductance device is coupled to a negative input of said amplifier.

24. The method according to claim 23, wherein said capacitors are said isolated by opening at least one switch between said capacitors and said first circuit.

25. A method for processing an electronic signal, the method comprising:
generating first differential signals by a first circuit based on outputs of an amplifier, said first circuit having a variable corner frequency;
generating second differential signals by a second circuit based on said first differential signals, wherein said first circuit is coupled to said second circuit via one or more switches, wherein said first circuit and said second circuit are part of a DC offset correction circuit, wherein said second differential signals represent an output of the DC offset correction circuit, wherein a positive output of said second circuit is coupled to a positive input of said amplifier, and wherein a negative output of said second circuit is coupled to a negative input of said amplifier;
selectively communicating said second differential signals to differential inputs of said amplifier in instances when at least a portion of a DC offset needs to be removed from outputs of said amplifier; and
isolating said second differential signals from differential inputs of said amplifier in instances when at least a portion of a DC offset does not need to be removed from outputs of said amplifier.

26. The method according to claim 25, wherein said second differential signals are isolated by opening at least one switch.

27. A system for processing an electronic signal, the system comprising:
a first circuit that generates first differential signals from outputs of an amplifier, wherein said first circuit has a variable corner frequency;
a second circuit that generates second differential signals from input signals that are based on said first differential signals, wherein said second differential signals are selectively communicated to inputs of said amplifier to remove at least a portion of a DC offset from said outputs of said amplifier, wherein said first circuit and said second circuit are part of a DC offset correction circuit, wherein said second differential signals represent an output of the DC offset correction circuit, wherein a positive output of said second circuit is coupled to a positive input of said amplifier, and wherein a negative output of said second circuit is coupled to a negative input of said amplifier; and
a switch that couples said first circuit to said second circuit, wherein said switch is opened to provide said input signals that are substantially constant from which to generate substantially constant second differential signals.

28. The system according to claim 27, wherein said switch comprises a double-pole switch.

29. The system according to claim 27, wherein said switch comprises two single-pole switches.

30. The system according to claim 27, comprising capacitors that are charged to respective voltages by a corresponding one of said first differential signals, wherein said input signals that are substantially constant are said respective voltages when said switch is opened.

31. A system for processing an electronic signal, the system comprising:
a first circuit that generates first differential signals based on outputs of an amplifier, wherein said first differential signals are generated at a second corner frequency for said first circuit after said first differential signals are generated at a first corner frequency for said first circuit, wherein said second corner frequency is lower than said first corner frequency; and
a second circuit that generates second differential signals based on said first differential signals, wherein said second differential signals are selectively communicated to inputs of said amplifier to remove at least a portion of a DC offset from said outputs of said amplifier, wherein said first circuit and said second circuit are part of a DC offset correction circuit, wherein said second differential signals represent an output of the DC offset correction circuit, wherein a positive output of said second circuit is coupled to a positive input of said amplifier, and wherein a negative output of said second circuit is coupled to a negative input of said amplifier, wherein the system keeps an amplifying bandwidth of said amplifier constant even when there are changes in a gain of said amplifier.

32. A system for processing an electronic signal, the system comprising:
a first circuit that generates first differential signals based on outputs of an amplifier, wherein said first circuit has a variable corner frequency;

a second circuit that generates second differential signals based on from said first differential signals, wherein said second differential signals are selectively communicated to inputs of said amplifier to remove at least a portion of a DC offset from said outputs of said amplifier, wherein said first circuit and said second circuit are part of a DC offset correction circuit, wherein said second differential signals represent an output of the DC offset correction circuit, wherein a positive output of said second circuit is coupled, via a switch, to a positive input of said amplifier, and wherein a negative output of said second circuit is coupled, via said switch, to a negative input of said amplifier;

said switch that couples said second circuit and said amplifier, wherein said switch is closed in instances when at least a portion of a DC offset needs to be removed from outputs of said second amplifier; and said switch is opened to prevent said second differential signals from being communicated to said amplifier in instances when at least a portion of a DC offset does not need to be removed from outputs of said second amplifier.

33. The system according to claim 32, wherein said switch comprises a double-pole switch.

34. The system according to claim 32, wherein said switch comprises two single-pole switches.

* * * * *

UNITED STATES PATENT AND TRADEMARK OFFICE
CERTIFICATE OF CORRECTION

| | | |
|---|---|---|
| PATENT NO. | : 7,969,222 B2 | Page 1 of 1 |
| APPLICATION NO. | : 11/385101 | |
| DATED | : June 28, 2011 | |
| INVENTOR(S) | : Stamatios Alexandros Bouras | |

It is certified that error appears in the above-identified patent and that said Letters Patent is hereby corrected as shown below:

Column 23, line 14 delete "said DC offset correction circuit" and insert --said DC offset correction circuit,--.

Column 25, line 2 delete "based on from said" and insert --based on said--.

Signed and Sealed this
Tenth Day of January, 2012

David J. Kappos
*Director of the United States Patent and Trademark Office*